US012608051B2

(12) United States Patent
Zhang et al.

(10) Patent No.: US 12,608,051 B2
(45) Date of Patent: Apr. 21, 2026

(54) FOLDING MECHANISM AND TERMINAL DEVICE

(71) Applicant: HONOR DEVICE CO., LTD., Shenzhen (CN)

(72) Inventors: Wei Zhang, Shenzhen (CN); Lei Feng, Shenzhen (CN); Wenxing Yao, Shenzhen (CN); Yameng Wei, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 408 days.

(21) Appl. No.: 18/019,331

(22) PCT Filed: Sep. 14, 2022

(86) PCT No.: PCT/CN2022/118815
§ 371 (c)(1),
(2) Date: Feb. 2, 2023

(87) PCT Pub. No.: WO2023/093226
PCT Pub. Date: Jun. 1, 2023

(65) Prior Publication Data
US 2025/0258522 A1 Aug. 14, 2025

(30) Foreign Application Priority Data
Nov. 29, 2021 (CN) .......................... 202111434016.X

(51) Int. Cl.
*G06F 1/16* (2006.01)
*H04M 1/02* (2006.01)
(52) U.S. Cl.
CPC .......... *G06F 1/1681* (2013.01); *G06F 1/1652* (2013.01)

(58) Field of Classification Search
CPC ...... G06F 1/1681; G06F 1/1652; F16C 11/04; H04M 1/022; H04M 1/0214; H04M 1/0268
(Continued)

(56) References Cited

U.S. PATENT DOCUMENTS 10,036,188 B1 7/2018 Yao et al.
10,480,225 B1 11/2019 Hsu et al.
(Continued)

FOREIGN PATENT DOCUMENTS

CN 205750631 U 11/2016
CN 108922408 A 11/2018
(Continued)

OTHER PUBLICATIONS

IP.com search history (Year: 2025).*

*Primary Examiner* — Moustapha Diaby
(74) *Attorney, Agent, or Firm* — WOMBLE BOND DICKINSON (US) LLP

(57) ABSTRACT

This application provides a folding mechanism and a terminal device, and relates to the field of terminal technologies. The folding mechanism includes a base, a support body, a first swing arm, and a second swing arm. A part of the first rotating body extends into the first groove, and the first rotating body is configured to provide a force for the support body in a rotation process, so that the support body moves toward or away from the base. The second swing arm includes a second rotating portion and a second rotating portion fastened to the second rotating portion. A part of the second rotating portion extends into the second groove, and the second rotating portion is configured to provide a force for the support body in a rotation process, so that the support body moves toward or away from the base.

20 Claims, 17 Drawing Sheets

(58) Field of Classification Search

USPC ....................................................... 455/575.3

See application file for complete search history.

(56) References Cited

U.S. PATENT DOCUMENTS

| | | |
|---|---|---|
| 11,086,356 B2 | 8/2021 | Hou et al. |
| 11,336,759 B2 | 5/2022 | Liao et al. |
| 2019/0174645 A1 | 6/2019 | Jeon et al. |
| 2020/0281085 A1 | 9/2020 | Jia |
| 2020/0293094 A1* | 9/2020 | Liu ........................ F16M 11/04 |
| 2022/0116489 A1 | 4/2022 | Nagai et al. |

FOREIGN PATENT DOCUMENTS

| | | |
|---|---|---|
| CN | 111629087 A | 9/2020 |
| CN | 111698355 A | 9/2020 |
| CN | 111885235 A | 11/2020 |
| CN | 213028129 U | 4/2021 |
| CN | 213270695 U | 5/2021 |
| CN | 112901649 A | 6/2021 |
| CN | 115013421 A | 9/2022 |
| WO | 2020259646 A1 | 12/2020 |
| WO | 2021208998 A1 | 10/2021 |

* cited by examiner

C

25

A-A

D 241 246 2521    252

2413

23 231 2521 252

22

25

2413 242 2421 241 233    21    2526 2527 232    H 25    22

H 2413  252

21 242  2421  2526

21  23  24  242 2421 2525  I

22

25

232

252

I

252

21    24  2421  242  2525

223(22)

2231

255

253

232          25

FOLDING MECHANISM AND TERMINAL DEVICE

CROSS-REFERENCE TO RELATED APPLICATIONS

This application is a National Stage of International Application No. PCT/CN2022/118815, filed on Sep. 14, 2022, which claims priority to Chinese Patent Application No. 202111434016.X, filed on Nov. 29, 2021, both of which are incorporated herein by references in their entireties.

TECHNICAL FIELD

This application relates to the field of terminal technologies, and in particular, to a folding mechanism and a terminal device.

BACKGROUND

With the advancement of science and technology and the advent of a large-screen intelligent terminal era, to resolve a problem that a tablet computer is large and inconvenient to carry, and a mobile phone screen is small, a foldable mobile phone has emerged.

The foldable mobile phone includes a housing, a folding mechanism, and a flexible display. The folding mechanism includes a rotating arm, a lifting door plate, and a spring. When the foldable mobile phone is in a flattened state, an upper surface of the lifting door plate is kept flush with an upper surface of the rotating arm under an action of the rotating arm, so that the lifting door plate and the rotating arm may jointly support the flexible display. In a folding process of the foldable mobile phone, the rotating arm compresses the spring, and the spring drives the lifting door plate fastened thereto to descend, so as to avoid a rounded corner generated when the flexible display is folded.

In a related technology, the spring and the rotating arm are mainly used to lower the lifting door plate. However, when the spring is compressed to a maximum compression amount, a specific space needs to be occupied, and an axial direction of the spring is the same as a thickness direction of the foldable mobile phone. Consequently, the folding mechanism occupies large space in the thickness direction of the foldable mobile phone.

SUMMARY

To resolve the foregoing technical problem, this application provides a folding mechanism and a terminal device, which can reduce space occupied by the folding mechanism in a thickness direction of a foldable mobile phone.

This application provides a folding mechanism, including a base: a support body, where the support body is connected to the base, the support body may move toward or away from the base, and the support body is provided with a first groove and a second groove that are corresponding to each other in position: a first swing arm, where the first swing arm includes a first rotating portion and a first rotating body fastened to the first rotating portion, the first rotating portion is rotatably connected to the base, a part of the first rotating body extends into the first groove, and the first rotating body is configured to provide a force for the support body in a rotation process, so that the support body moves toward or away from the base: and a second swing arm, where the second swing arm includes a second rotating portion and a second rotating body fastened to the second rotating portion, the second rotating portion is rotatably connected to the base, a part of the second rotating body extends into the second groove, and the second rotating body is configured to provide a force for the support body in a rotation process, so that the support body moves toward or away from the base.

In this application, the first swing arm and the second swing arm may be folded or unfolded. In a process of unfolding the first swing arm and the second swing arm, the first swing arm and the second swing arm can provide a force for the support body, so that the support body moves away from the base, that is, the support body can rise. When the folding mechanism is applied to a terminal device, the support body can provide support for a flexible display jointly with the first swing arm and the second swing arm. In a process of folding the first swing arm and the second swing arm, the first swing arm and the second swing arm can provide a force for the support body, so that the support body moves toward the base, that is, the support body can descend, so as to avoid a rounded corner generated when the flexible display is bent. It can be learned that the folding mechanism in this application does not need to use a spring, and therefore, space required by the spring when the spring is compressed to a limit does not need to be reserved. That is, in this embodiment of this application, space in a thickness direction of the folding mechanism can be reduced, and a thickness of the terminal device is further reduced.

In addition, a part of the first rotating body extends into the first groove, and therefore, regardless of whether the first swing arm and the second swing arm are in a flattened state or in a folded state, the first rotating body may provide the support body with a limit in a thickness direction of the terminal device, thereby limiting a displacement of the support body in the thickness direction, and reducing damage to the flexible display or another component of the terminal device caused by a large displacement of the support body.

In some possible implementations, the support body includes a first fixing plate and a second fixing plate that are disposed opposite to each other, and a third fixing plate connected between the first fixing plate and the second fixing plate, and the third fixing plate separates space between the first fixing plate and the second fixing plate into the first groove and the second groove. The support body may be formed through integral molding or welded with the first fixing plate, the second fixing plate, and the third fixing plate. A structure of the support body is relatively simple.

In some possible implementations, the second fixing plate is closer to the base than the first fixing plate, a size of the second fixing plate in a first direction is greater than a size of the first fixing plate in the first direction, and the first direction is a direction of an arrangement direction of the first swing arm and the second swing arm. In this way, in a process of folding the first swing arm and the second swing arm, the first fixing plate can provide enough space for rotation of the first rotating body, so as to prevent interference of the first fixing plate and the first swing arm.

In some possible implementations, the first fixing plate has a first surface facing the second fixing plate; and the first rotating body includes a first pressure surface, and when the first swing arm and the second swing arm are in a flattened state, the first pressure surface abuts against the first surface. In this way, in a process of unfolding the first swing arm and the second swing arm, and when the first swing arm and the second swing arm are in a flattened state, the first pressure surface can always provide a force for the first surface.

In some possible implementations, the second fixing plate has a second surface facing the first fixing plate; and the first rotating body further includes a second pressure surface connected to the first pressure surface, and in a process of folding the first swing arm and the second swing arm, the second pressure surface interacts with the second surface. In this way, in a process of folding the first swing arm and the second swing arm, the second pressure surface can provide a force for the second surface, so that the support body moves toward the base.

In some possible implementations, the first pressure surface includes a first plane. In a process of unfolding the first swing arm and the second swing arm, and when the first swing arm and the second swing arm are in a flattened state, the first pressure surface needs to continuously provide a force for the first surface, and when the first pressure surface includes a plane, the plane may provide a force for the first surface, so that the first rotating body can provide relatively stable support for the support body.

In some possible implementations, the second pressure surface includes a second plane, the second plane is connected to the first pressure surface, and when the first swing arm and the second swing arm are in a folded state, the second plane abuts against the second surface. In this way, when the first swing arm and the second swing arm are in a folded state, the second plane may provide a force for the second surface, so that the first rotating body can provide relatively stable support for the support body.

In some possible implementations, the second pressure surface further includes a first arc surface that is connected to the second plane and protrudes outward. In a process of folding the first swing arm and the second swing arm, the first arc surface interacts with the second surface, thereby reducing a case in which a bump occurs in a moving process of the support body due to an uneven surface, that is, the support body can move smoothly.

In some possible implementations, the second pressure surface further includes a third plane connected to the first arc surface, and the third plane is further configured to: when the first swing arm and the second swing arm are in a flattened state, a part of the third plane abuts against the second surface. In this way, the third plane can provide stable support for the support body.

In some possible implementations, the first pressure surface and the second pressure surface are connected to form a second arc surface, and in a process of folding the first swing arm and the second swing arm, the second arc surface interacts with the second surface; and in a process of unfolding the first swing arm and the second swing arm, the second arc surface interacts with the first surface. In this way, in a process of unfolding the first swing arm and the second swing arm, the second arc surface always interacts with the first surface; and in a process of folding the first swing arm and the second swing arm, the second arc surface also always interacts with the second surface. However, the arc surface has a characteristic of smooth surface. Therefore, the support body can move more smoothly.

In some possible implementations, the first rotating body includes a connector and a fastener fastened to the connector, at least a part of the fastener extends into the first groove, and the fastener is configured to provide, in a rotation process, a force for the support body to move toward or away from the base. In this way, in a process of unfolding or folding the first swing arm and the second swing arm, the fastener can always provide a force for the support body, so that the support body moves away from or toward the base.

In some possible implementations, the connector is located on a side surface of the support body, the fastener is disposed toward the side surface, and the side surface is a surface adjacent to a side on which the first swing arm is located. When the connector is on the side surface, the fastener may extend from the side surface into the first groove.

In some possible implementations, a first incision is disposed on a first side surface of the first rotating portion, a part of the first rotating body extends into the first incision, and the first side surface is a surface that is of the first rotating portion and that is opposite to the second rotating portion when the first swing arm and the second swing arm are in a flattened state. In this way, a lateral size of the first swing arm can be reduced. Because a lateral direction of the first swing arm is the same as a width direction of the terminal device, a size of a folding assembly along the width direction of the terminal device can be further reduced. In addition, a size of the first rotating body in the width direction of the terminal device may be increased, so as to improve strength of the first rotating body.

In some possible implementations, the first incision has two opposite side walls, and the first rotating body is fastened to the two side walls. A fastening structure of the first rotating body on the first rotating portion is relatively simple.

In some possible implementations, the first fixing plate includes a fastening body and a convex portion fastened to a side of the fastening body, and a part of the convex portion extends into the first incision. In this way, a size of the support body in the width direction of the terminal device can be further increased, and a size of the entire folding mechanism in the width direction of the terminal device can be reduced. Because the support body is provided with the first groove and the second groove, the foregoing structure may improve strength of the support body to a specific extent, and alleviate the following case: A third connecting plate between the first groove and the second groove is relatively small because a size of the support body along the width direction of the terminal device is relatively small, which causes a crack of the support body when the support body is stressed.

In some possible implementations, a first through hole is disposed on a second side surface of the first rotating portion, the second side surface is adjacent to the first side surface, and the first incision is connected to the first through hole; and the first rotating body further has a connection surface facing the first through hole, and a projection of the connection surface on the side wall is in contact with or has a clearance with an edge of a projection of the first through hole on the side wall. When the folding mechanism is applied to the terminal device, the folding mechanism further includes a first rotating shaft, the first rotating shaft is rotatably connected to the base, and the first swing arm is fastened to the first rotating shaft. When assembling the terminal device, the first swing arm may be first fabricated, and then the first swing arm and the first rotating shaft are assembled. Therefore, the projection of the connection surface on the side wall is in contact with or has a clearance with an edge of a projection of the first through hole on the side wall, so that assembly is relatively convenient. In addition, a size of the first rotating body along the width direction of the terminal device can be further increased, so that strength of the first rotating body can be improved.

In some possible implementations, there are a plurality of the first rotating bodies, there are a plurality of the first grooves, and at least two first rotating bodies are in a one-to-one correspondence with two first grooves; and/or, there are a plurality of the second rotating bodies, there are a plurality of the second grooves, and at least two second rotating bodies are in a one-to-one correspondence with two second grooves. In this way, a plurality of the first rotating bodies can provide a more stable force for the support body, so that movement of the support body is more stable. A plurality of the second rotating bodies can also provide a more stable force for the support body, so that movement of the support body is more stable.

In some possible implementations, the folding mechanism further includes a third swing arm, the third swing arm is connected to the base in a manner that the third swing arm can slide along the arc surface, the third swing arm and the first swing arm are arranged in a second direction, and the third swing arm is connected to the first swing arm, so that the third swing arm moves relative to the base in a manner synchronous with the first swing arm; and/or the folding mechanism further includes a fourth swing arm, and the fourth swing arm is connected to the base in a manner that the third swing arm can slide along the arc surface, the fourth swing arm and the second swing arm are arranged in the second direction, and the fourth swing arm is connected to the second swing arm, so that the fourth swing arm moves relative to the base in a manner synchronous with the first swing arm. The second direction is perpendicular to a movement direction of the support body and the first direction. In this way, the first swing arm and the third swing arm, and the second swing arm and the fourth swing arm can jointly provide support for the flexible display, thereby increasing a support area of the folding mechanism to the flexible display, and further improving support strength to the flexible display. In addition, the first swing arm and the third swing arm always keep moving synchronously, and the second swing arm and the fourth swing arm always keep moving synchronously. Therefore, in a process of folding or unfolding the terminal device, the flexible display can always keep a relatively high flatness, thereby increasing a service life of the flexible display.

In some possible implementations, a first chute is disposed on a surface that is of the third swing arm and that faces the first swing arm. The first swing arm further includes a third rotating portion fastened to the first rotating portion and a first coupling shaft rotatably connected to the third rotating portion, and a part of the first coupling shaft extends into the first chute. In this way, in a process in which the first swing arm rotates around the first rotating shaft, the third rotating portion can drive the third swing arm by using the first coupling shaft, so that the third swing arm always rotates with the first swing arm synchronously.

In some possible implementations, a second chute is disposed on a surface that is of the fourth swing arm and that faces the second swing arm. The second swing arm further includes a fourth rotating portion fastened to the second rotating portion and a second coupling shaft rotatably connected to the fourth rotating portion, and a part of the second coupling shaft extends into the second chute. The second swing arm may be connected to the base by using a second rotating shaft (another rotating shaft parallel to the first rotating shaft). In a process in which the second swing arm rotates around the second rotating shaft, the fourth rotating portion can drive the fourth swing arm by using the second coupling shaft, so that the fourth swing arm always rotates with the second swing arm synchronously.

In some possible implementations, the first swing arm and the second swing arm are symmetrical about a center plane of the support body, and the center plane is a plane that is located in a geometric center of the support body and that is perpendicular to the first direction. In this way, support points provided by the first swing arm and the second swing arm to the support body are corresponding, thereby further improving motion stability of the support body.

This application provides a terminal device, including the folding mechanism according to any one of the foregoing implementations. The terminal device can achieve all effects of the foregoing folding mechanism.

BRIEF DESCRIPTION OF DRAWINGS

To describe technical solutions in embodiments of this application more clearly, the following briefly describes accompanying drawings required for description of embodiments of this application. Apparently, the accompanying drawings in the following description show only some embodiments of this application, and a person of ordinary skill in the art may still derive other drawings from these accompanying drawings without creative efforts.

FIG. 6a is a schematic diagram of a three-dimensional structure of a first rotating shaft in the folding mechanism shown in FIG. 3;

FIG. 6b is a side view of the first rotating shaft shown in FIG. 6a;

FIG. 10b is a partially enlarged schematic view of C of the torsion swing arm shown in FIG. 10a;

FIG. 11a is a sectional view of the folding mechanism shown in FIG. 3 in an AA direction;

FIG. 11b is a partially enlarged schematic view of D in the sectional view shown in FIG. 11a;

Figure 1A:
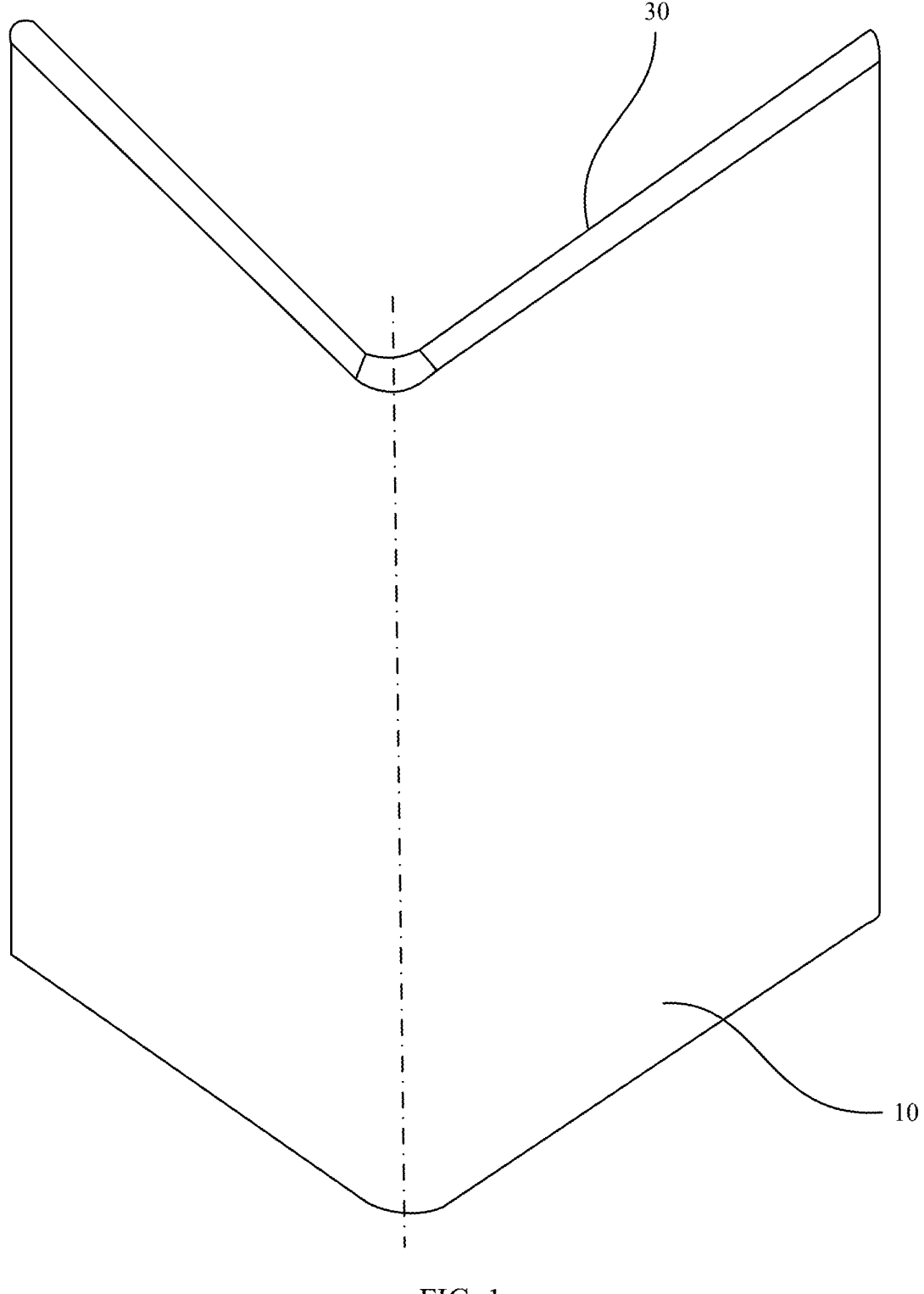
FIG. 1a is a schematic diagram of a structure of a foldable mobile phone in a semi-folded state according to an embodiment of this application.

Reference numerals: 10—Housing: 11—Through groove; 20—Folding mechanism; 21—Base: 211—Baseplate; 2111—Accommodating groove; 2112—Baseplate clamping groove; 2113—Bottom wall; 2114—Clamping groove side wall; 2115—Clamping groove bottom wall; 212—Mounting base; 213—Blocking portion; 214—Positioning position; 22—Main swing arm; 221—Arm plate; 222—First clamping portion; 2221—Clamping portion clamping groove; 2223—Protruding part; 223—Second clamping portion; 2231—Chute; 23—Synchronization mechanism; 231—Gear; 232—First rotating shaft; 2321—Rotating shaft incision; 233—Second rotating shaft; 24—Support body; 241—Upper fixing plate; 2411—Fastening body; 2412—Convex portion; 2413—Lower surface; 242—Lower fixing plate; 2421—Upper surface; 243—Vertical fixing plate; 2431—Positioning hole; 244—Side fixing plate; 245—Accommodating cavity; 246—Groove; 25—Torsion swing arm; 251—First rotating portion; 2511—First through hole; 2512—Rotating portion incision; 2513—First side surface; 2514—Second side surface; 2515—Incision side wall; 252—Rotating body; 2521—First pressure surface; 2522—Second pressure surface; 2523—First connection surface; 2524—Third connection surface; 2525—First plane; 2526—Circular arc surface; 2527—Second plane; 2528—Second connection surface; 2529—Connector; 2530—Fixing post; 253—Second rotating portion; 2531—Second through hole; 254—Connecting plate; 255—Coupling shaft; 30—Flexible display; E—Length direction; F—Width direction; G—Thickness direction.

DESCRIPTION OF EMBODIMENTS

The following clearly describes the technical solutions in embodiments of this application with reference to the accompanying drawings in embodiments of this application. Apparently, the described embodiments are merely some rather than all of embodiments of this application. Based on embodiments of this application, all other embodiments obtained by a person of ordinary skill in the art without creative efforts shall fall within the protection scope of this application.

The term "and/or" in the text merely describes an association relationship between associated objects, and indicates that three relationships may exist. For example, A and/or B may indicate the following three cases: Only A exists, both A and B exist, and only B exists.

The terms "first", "second", and the like in the specification and claims of embodiments of this application are used to distinguish between different objects, and are not used to indicate a specific sequence of objects. For example, a first target object, a second target object, and the like are used to distinguish between different target objects, and are not used to indicate a specific order of target objects.

In embodiments of this application, the word such as "as an example" or "for example" is used to represent giving an example, an illustration, or a description. Any embodiment or design scheme described as "as an example" or "for example" in embodiments of this application should not be explained as being preferred or having more advantages than another embodiment or design scheme. To be precise, the use of the word such as "as an example" or "for example" is intended to present a related concept in a specific manner.

In the description of embodiments of this application, unless otherwise stated, "a plurality of" means two or more. For example, a plurality of processing units refer to two or more processing units, and a plurality of systems refer to two or more systems.

Embodiments of this application provide a folding mechanism, and the folding mechanism may be applied to a foldable mobile phone. The folding mechanism may also be applied to a terminal device having a folding function, such as a foldable tablet computer, a foldable game machine, and a personal digital assistant (personal digital assistant, PDA). A specific form of the foregoing terminal device is not limited in this embodiment of this application.

Figure 1B:
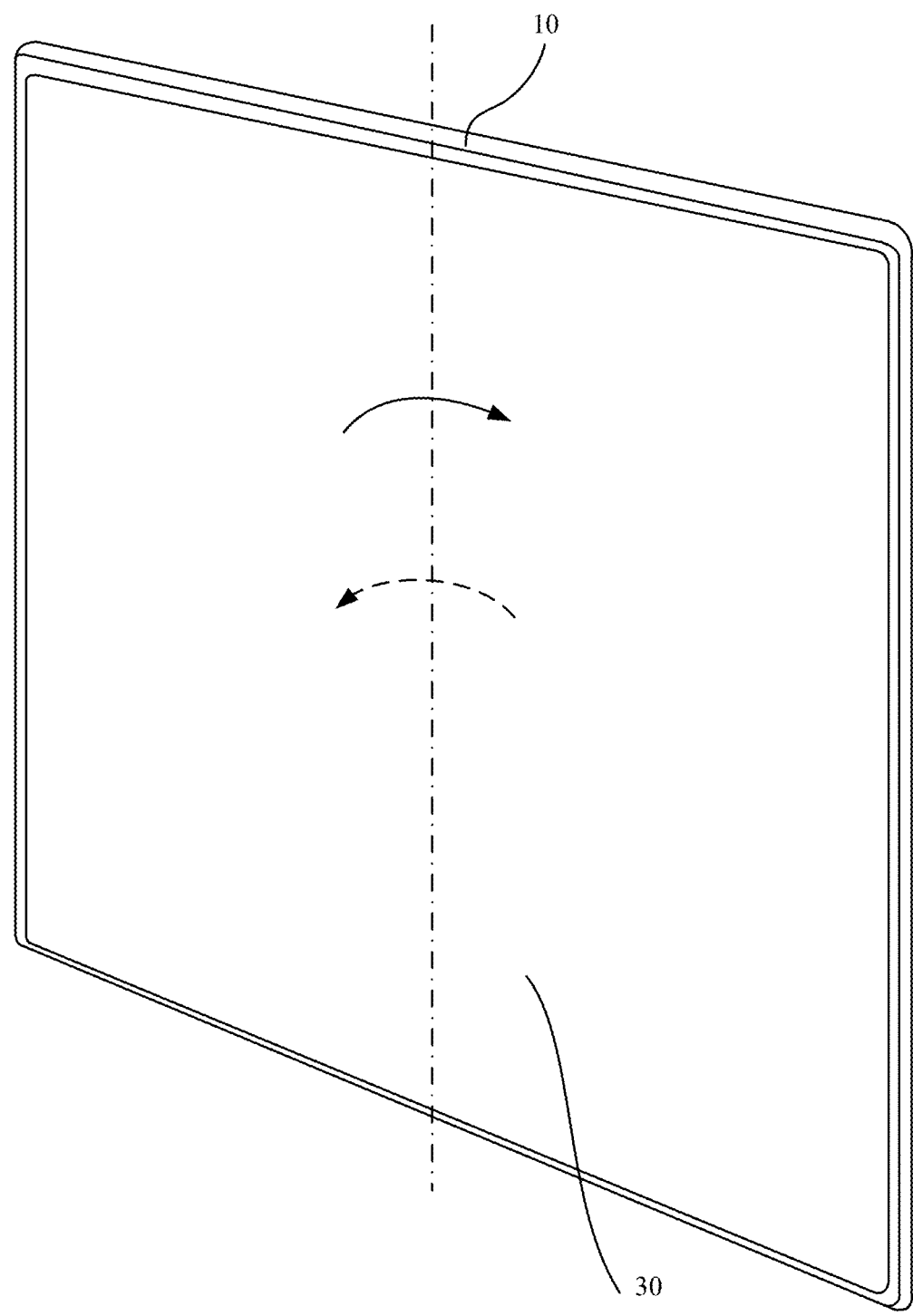
FIG. 1b is a schematic diagram of a structure of a foldable mobile phone in a flattened state according to an embodiment of this application.

As shown in FIG. 1*a* and FIG. 1*b*, a foldable mobile phone may be folded along a center of the foldable mobile phone. When the foldable mobile phone is in a folded state, that is, a folding angle of the foldable mobile phone is 0, a size of the foldable mobile phone may be reduced. When the foldable mobile phone is in a flattened state, that is, a folding angle of the foldable mobile phone is 180°, and a flexible display 30 is in a state of a maximum display area, and in this case, a user may perform an operation on the flexible display 30. It should be noted that the folding angle refers to an included angle between left and right parts of the foldable mobile phone.

Figure 2:
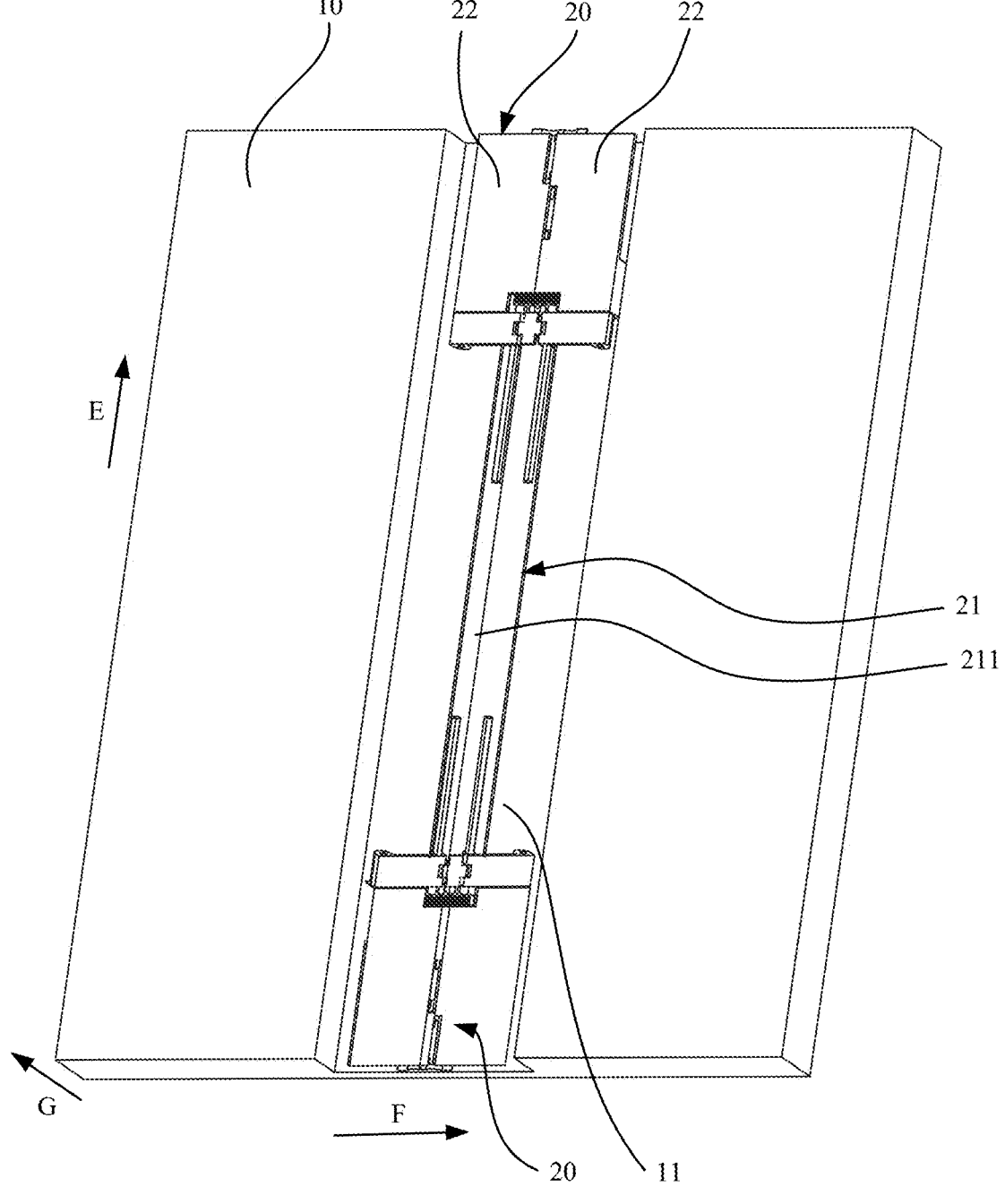
FIG. 2 is a schematic diagram of an assembly structure of a housing and a folding mechanism according to an embodiment of this application.

To clearly describe the technical solutions in embodiments of this application, as shown in FIG. 2, three directions may be defined: a length direction E (a second direction) of the foldable mobile phone, a width direction F (a first direction) of the foldable mobile phone, and a thickness direction G of the foldable mobile phone.

In addition, in this embodiment of this application, "up", "down", "left", and "right" refer to directions determined, with hands of the user as reference, when the foldable mobile phone is in a flattened state, the user holds the foldable mobile phone with both hands and the flexible display 30 faces the user.

As shown in FIG. 2, the foldable mobile phone includes a housing 10, a folding mechanism 20, and a flexible display 30 (not shown in FIG. 2). A through groove 11 is disposed on a side surface of the housing 10, and the folding mechanism 20 is connected to the through groove 11. The flexible display 30 is fastened to a side surface that is of the housing 10 and that is provided with the through groove 11.

Figure 3:
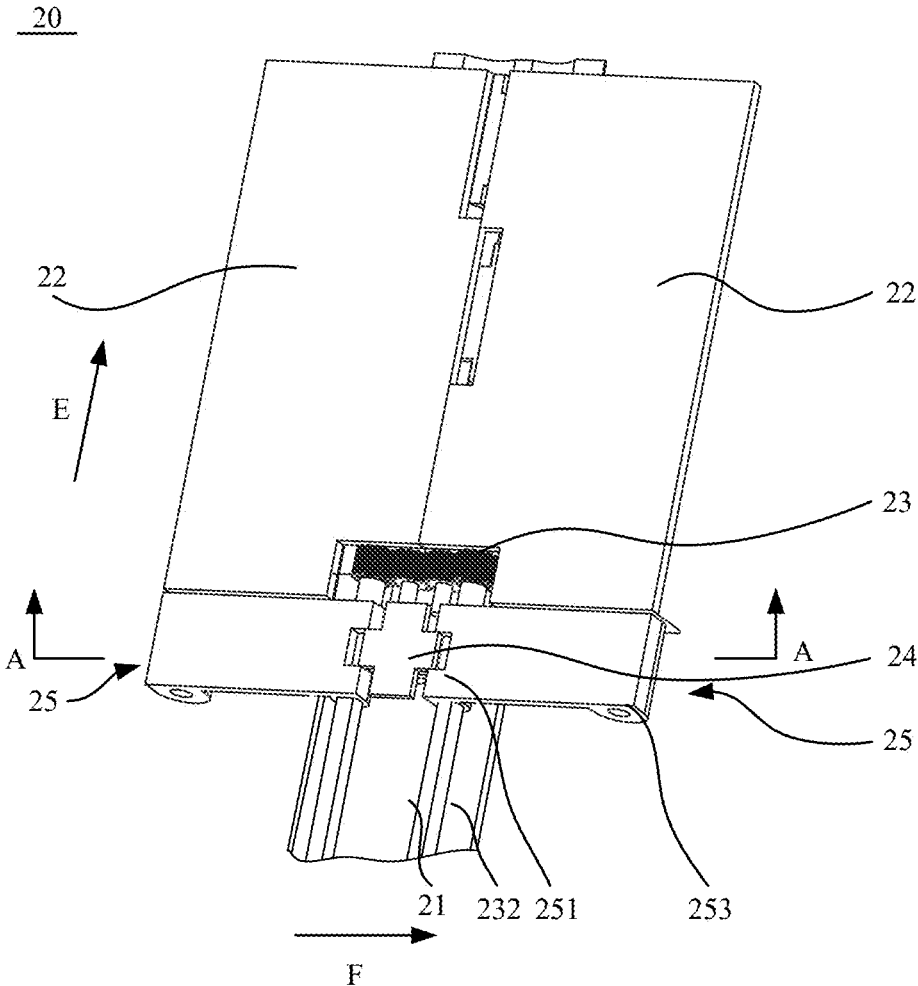
FIG. 3 is a schematic diagram of a structure of a folding mechanism according to an embodiment of this application.

As shown in FIG. 3, the folding mechanism 20 includes a base 21, two main swing arms 22, a synchronization mechanism 23, a support body 24, and two torsion swing arms 25. In this embodiment, as shown in FIG. 2, there may be two folding mechanisms 20, and the two folding mechanisms 20 are respectively disposed at two ends of the housing 10.

In another embodiment of this application, there may be one, three, or more folding mechanisms 20. When there is one folding mechanism 20, the folding mechanism 20 may be disposed in a middle of the base 21 along the length direction E. When there are a plurality of folding mechanisms 20, the plurality of folding mechanisms 20 may be distributed evenly along the length direction E.

Figure 4:
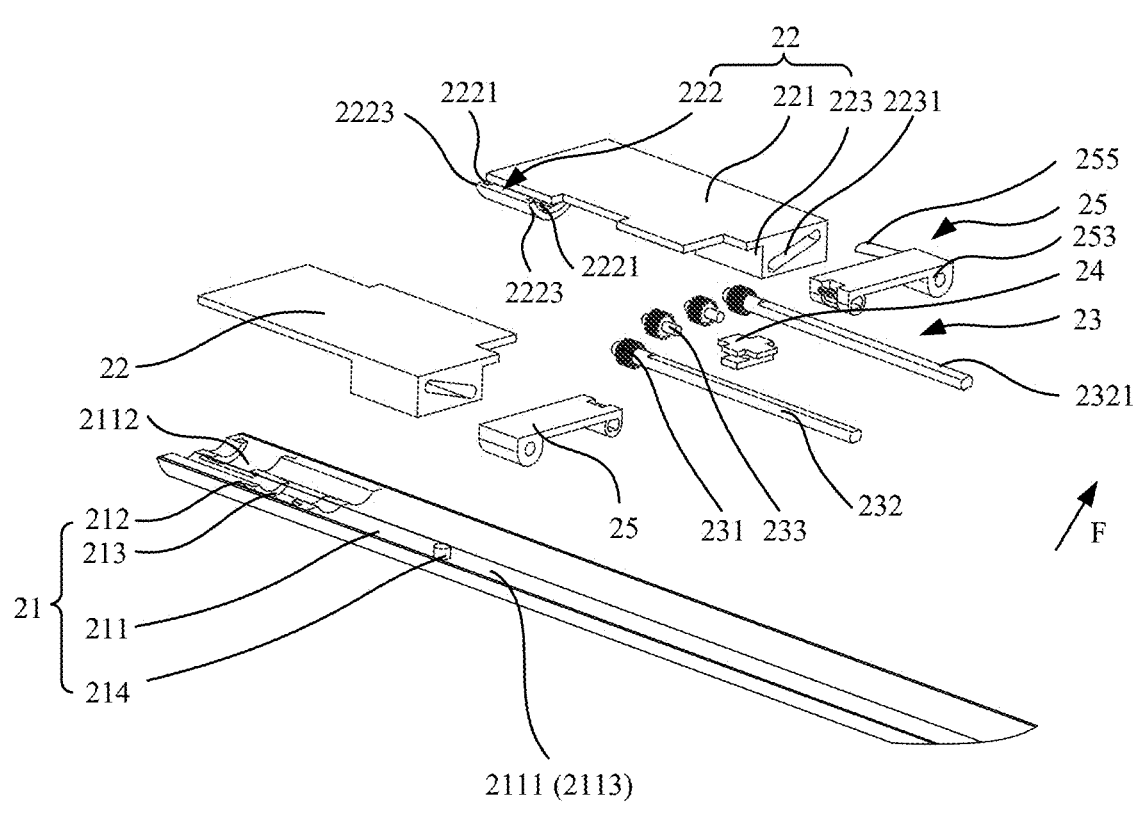
FIG. 4 is a schematic diagram of a disassembly structure of the folding mechanism shown in FIG. 3.

As shown in FIG. 4, the base 21 includes a baseplate 211, a mounting base 212, a blocking portion 213, and a positioning position 214.

As shown in FIG. 2, the baseplate 211 is fastened to the through groove 11 of the housing 10. As shown in FIG. 4, the baseplate 211 has an accommodating groove 2111, and a bottom wall 2113 of the accommodating groove 2111 is a plane.

Figure 5:
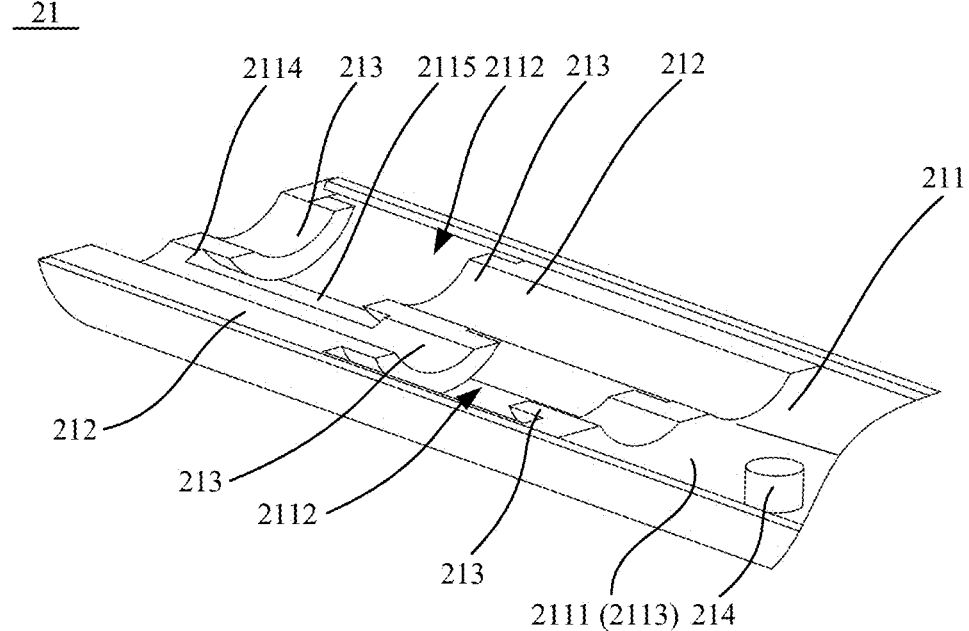
FIG. 5 is a schematic diagram of a local structure of a base in the folding mechanism shown in FIG. 3.

As shown in FIG. 4, the mounting base 212 is fastened to the accommodating groove 2111. As shown in FIG. 5, a baseplate clamping groove 2112 is disposed on one side that is of the mounting base 212 and that is away from the baseplate 211. Two opposite clamping groove side walls 2114 of the baseplate clamping groove 2112 are provided with one blocking portion 213, there is a clearance between the two blocking portions 213, and there is a clearance between a clamping groove bottom wall 2115 and the blocking portion 213. A surface that is of the blocking portion 213 and that faces the clamping groove bottom wall 2115 is a circular arc surface. There may be two baseplate clamping grooves 2112, and the two baseplate clamping grooves 2112 are arranged in staggered order on the base 21.

As shown in FIG. 5, the positioning position 214 is fastened to the bottom wall 2113 of the base 21, and a shape of a projection of the positioning position 214 on the bottom wall 2113 may be circular. In another embodiment of this application, the projection of the positioning position 214 on the bottom wall 2113 may also be in a shape of a square or a rectangle.

As shown in FIG. 5, in this embodiment, there may be one positioning position 214. In another embodiment of this application, there may be a plurality of positioning positions 214. When there are a plurality of positioning positions 214, the plurality of positioning positions 214 may be arranged in a straight line, in a triangular shape, in a rectangular shape, or the like.

As shown in FIG. 2, the two main swing arms 22 are disposed side by side along the width direction F, and both the two main swing arms 22 are rotatably connected to the base 21.

As shown in FIG. 4, the main swing arm 22 includes an arm plate 221, a first clamping portion 222, and a second clamping portion 223. Both the first clamping portion 222 and the second clamping portion 223 are fastened to a side that is of the arm plate 221 and that faces the base 21.

As shown in FIG. 4, a surface that is of the first clamping portion 222 and that faces the base 21 is a circular arc surface, two end faces of the first clamping portion 222 extend inwardly and are provided with a clamping portion clamping groove 2221, a protruding part 2223 is formed on the first clamping portion 222, the protruding part 2223 may be accommodated in the baseplate clamping groove 2112, and a surface that is of the protruding part 2223 and that faces the arm plate 221 is a circular arc surface. The blocking portion 213 of the base 21 may be accommodated in the clamping portion clamping groove 2221, and the surface that is of the protruding part 2223 and that faces the arm plate 221 abuts against the surface that is of the blocking portion 213 and that faces the clamping groove bottom wall 2115. In this way, the main swing arm 22 may be connected to the base 21 by using the protruding part 2223. Because both the surface that is of the blocking portion 213 and that faces the clamping groove bottom wall 2115 and the surface that is of the protruding part 2223 and that faces the arm plate 221 are circular arc surfaces, in a process of folding or unfolding the foldable mobile phone, the main swing arm 22 moves along the circular arc surface of the blocking portion 213.

As shown in FIG. 4, one end face of the second clamping portion 223 extends inwardly and is provided with a chute 2231 that runs through the other end face, and a shape of the chute 2231 is a runway. Specifically, a center of the chute 2231 is a rectangle, two ends are semi-circular, and semi-circular shapes of both ends are adjacent to two sides of the rectangle.

As shown in FIG. 4, the synchronization mechanism 23 includes four gears 231, two first rotating shafts 232, and two second rotating shafts 233. The four gears 231 are sequentially arranged along the width direction F of the foldable mobile phone, and each two adjacent gears 231 in the four gears 231 are engaged with each other. The two gears 231 in the middle of the four gears 231 may be slightly lower than the other two gears 231 at edges. Dimensions of the four gears 231 are the same. In this way, in a process of folding or unfolding the foldable mobile phone, the four gears 231 can always rotate synchronously in a process of rotating.

As shown in FIG. 4, the two first rotating shafts 232 are parallel to each other, and are rotatably connected to the base 21; and two gears 231 at edges in the four gears 231 are respectively fastened to the two first rotating shafts 232; that is, one of the two gears 231 at edges is fastened to one first rotating shaft 232, and the other gear 231 is fastened to the other first rotating shaft 232.

Figures 6A, 6B:
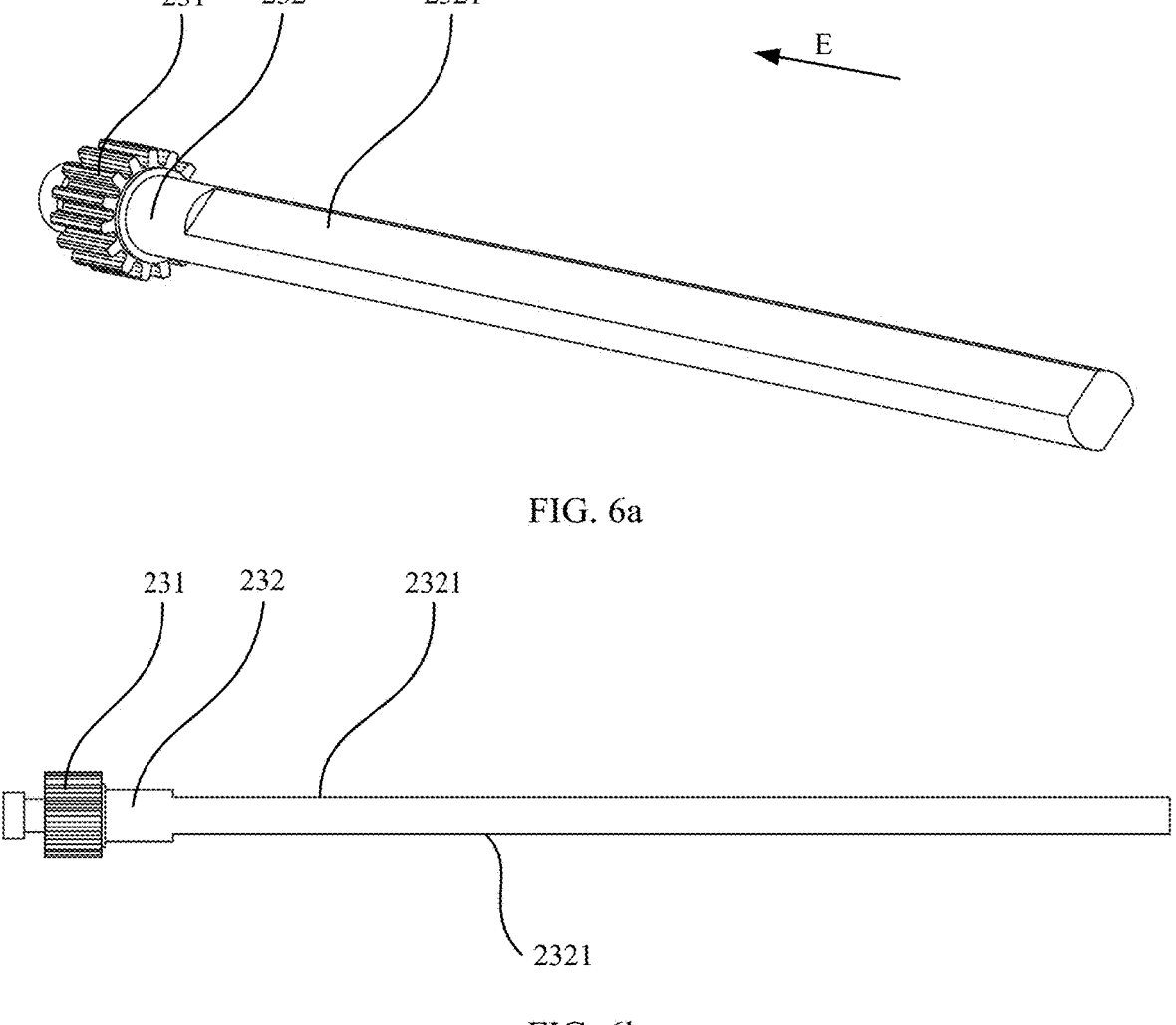

As shown in FIG. 6a, one end face of the first rotating shaft 232 extends inwardly and is provided with a rotating shaft incision 2321, a size of the rotating shaft incision 2321 along the length direction E of the foldable mobile phone is less than a length of the first rotating shaft 232, and a projection of the gear 231 on the first rotating shaft 232 does not overlap the rotating shaft incision 2321. As shown in FIG. 6b, in this embodiment of this application, there may be two rotating shaft incisions 2321, and the two rotating shaft incisions 2321 are evenly disposed in a circumferential direction of the first rotating shaft 232. In another embodiment of this application, there may be one or three rotating shaft incisions 2321.

It should be noted that when there are a plurality of folding mechanisms 20, the first rotating shafts 232 in each folding mechanism 20 may be mutually fastened. Specifically, a plurality of the first rotating shafts 232 may be used as an integral structure. In this way, a synchronization mechanism 23 of each folding mechanism 20 can rotate synchronously, thereby increasing stability of a folding process of the foldable mobile phone.

Both the two second rotating shafts 233 are rotatably connected to the base 21. As shown in FIG. 4, the two gears 231 in the middle of the four gears 231 are respectively fastened to the two second rotating shafts 233: that is, one of the two gears 231 in the middle is fastened to one second rotating shaft 233, and the other gear 231 is fastened to the other second rotating shaft 233. A length of the second rotating shaft 233 is less than the length of the first rotating shaft 232.

Figure 7:
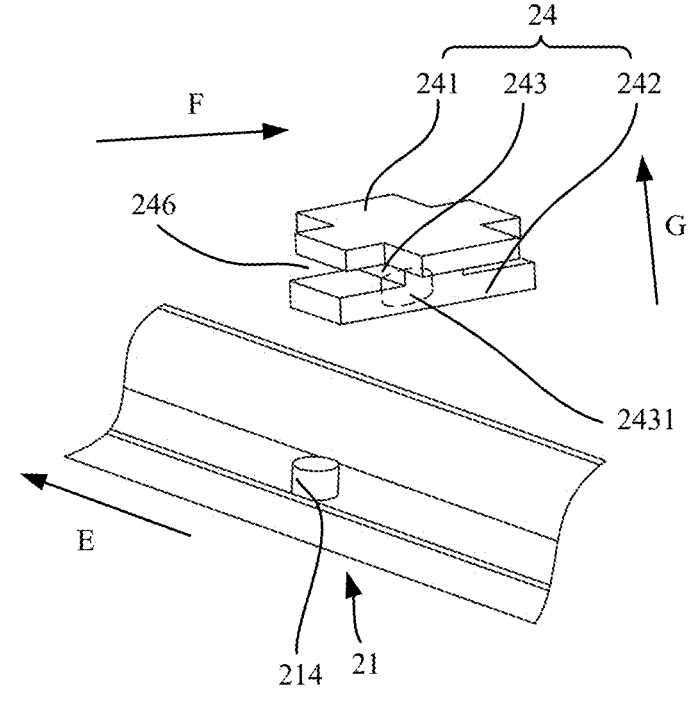
FIG. 7 is a schematic diagram of disassembly structures of a support body and the base in the folding mechanism shown in FIG. 3.

As shown in FIG. 3, the support body 24 is connected to the base 21. As shown in FIG. 7, the support body 24 includes an upper fixing plate 241, a lower fixing plate 242, and a vertical fixing plate 243. The upper fixing plate 241 and the lower fixing plate 242 are parallel to each other, the vertical fixing plate 243 is fastened between the upper fixing plate 241 and the lower fixing plate 242, and the vertical fixing plate 243 is perpendicular to both the upper fixing plate 241 and the lower fixing plate 242.

It should be noted that, in this embodiment, the support body 24 may be welded by using the upper fixing plate 241, the lower fixing plate 242, and the vertical fixing plate 243. The vertical fixing plate 243 may separate space between the upper fixing plate 241 and the lower fixing plate 242 into two grooves 246. The support body 24 may also be fabricated by using a casting method. Then, grooves 246 are separately processed on two opposite side surfaces of the support body 24 (as shown in FIG. 7).

Figure 8:
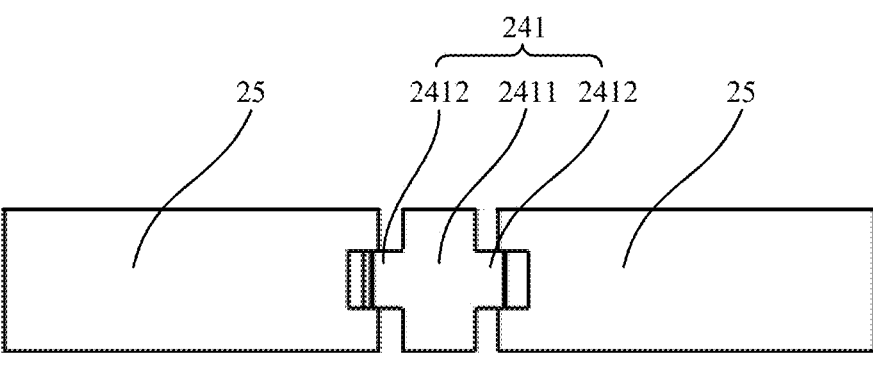
FIG. 8 is a schematic diagram of an assembly structure of the support body and a torsion swing arm in the folding mechanism shown in FIG. 3.

As shown in FIG. 8, a plate surface shape of the upper fixing plate 241 may be a "cross" shape. Specifically, the upper fixing plate 241 includes a fastening body 2411 and two convex portions 2412 respectively located on two sides of the fastening body 2411.

As shown in FIG. 7, a shape of the lower fixing plate 242 may be rectangular, and the lower fixing plate 242 is closer to the base 21 than the upper fixing plate 241. A size of the lower fixing plate 242 in the width direction F may be greater than a size in the length direction E. The lower fixing plate 242 is closer to the base 21 is not in contact with or not connected to the flexible display 30, and does not need to provide support for the flexible display 30. Therefore, a size of the lower fixing plate 242 in the length direction E may be less than a size of the upper fixing plate 241 in the length direction E. In this way, a weight of the lower fixing plate 242 can be reduced, and a weight of the foldable mobile phone can be reduced.

As shown in FIG. 7, a size of the vertical fixing plate 243 along the length direction E of the foldable mobile phone may be less than or equal to a size of the upper fixing plate 241 along the length direction E of the foldable mobile phone. In this way, a weight of the vertical fixing plate 243 can be further reduced as much as possible while satisfying connection strength between the upper fixing plate 241 and the lower fixing plate 242.

As shown in FIG. 7, a positioning hole 2431 is disposed on the lower fixing plate 242, and the positioning position 214 of the base 21 may be located in the positioning hole 2431. In this way, after the support body 24 is connected to the base 21, the support body 24 may slide along the thickness direction G of the foldable mobile phone. When the foldable mobile phone is folded or unfolded, the positioning position 214 can provide lateral positioning for the support body 24, so as to alleviate the following case: The support body 24 generates excessive lateral displacement in a process of folding or unfolding the foldable mobile phone.

As shown in FIG. 7, the positioning hole 2431 matches the positioning position 214, that is, a shape of the positioning hole 2431 may be the same as a cross-sectional shape of the positioning position 214. For example, when the cross-sectional shape of the positioning position 214 is circular, the positioning hole 2431 is a circular hole. In addition, a fit relationship between the positioning position 214 and the positioning hole 2431 may be clearance fit. It should be noted that the cross-sectional shape of the positioning position 214 is a shape of a plane cut along a cross-sectional surface perpendicular to the thickness direction G of the foldable mobile phone.

As shown in FIG. 7, a quantity of the positioning holes 2431 is the same as a quantity of the positioning positions 214, and locations are set in a one-to-one correspondence.

When there is one positioning position 214, and there is one positioning hole 2431. In this embodiment of this application, a size of the lower fixing plate 242 in the length direction E of the foldable mobile phone is relatively small. Therefore, a lateral positioning function of the support body 24 can be implemented by disposing only one group of positioning position 214 and positioning hole 2431. In another embodiment of this application, there may be a plurality of the positioning positions 214 and the positioning holes 2431, and the plurality of positioning holes 2431 may also be arranged in a shape of a triangle or a rectangle. In this way, a lateral positioning function of the positioning position 214 on the support body 24 can be further improved.

As shown in FIG. 3, the two torsion swing arms 25 are arranged in the width direction F of the foldable mobile phone.

Figure 9:
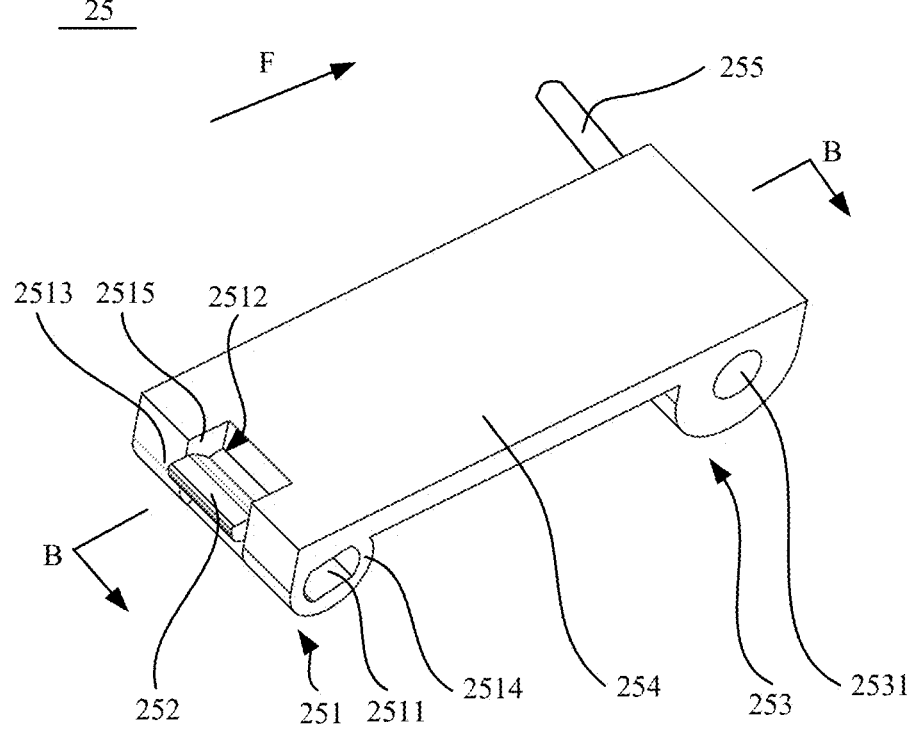
FIG. 9 is a schematic diagram of a three-dimensional structure of the torsion swing arm in the folding mechanism shown in FIG. 3.

As shown in FIG. 9, the torsion swing arm 25 includes a first rotating portion 251, a rotating body 252, a second rotating portion 253, a connecting plate 254, and a coupling shaft 255, where the connecting plate 254 is fastened between the first rotating portion 251 and the second rotating portion 253, and the rotating body 252 is fastened to the first rotating portion 251. As shown in FIG. 3, the first rotating portion 251 is fastened to the first rotating shaft 232, and the second rotating portion 253 is connected to the main swing arm 22 by using the coupling shaft 255 (not shown in FIG. 3).

The first rotating portion 251 is fastened to a part that is of the first rotating shaft 232 and that has the rotating shaft incision 2321. As shown in FIG. 9, a first through hole 2511 is disposed on an end face of the first rotating portion 251, and the first through hole 2511 is loosely fitted with the first rotating shaft 232 shown in FIG. 4. The rotating shaft incision 2321 may be disposed inwardly from a side that is of the first rotating shaft 232 and that faces the support body 24. Because the first rotating shaft 232 and the support body 24 are generally arranged in the width direction F of the terminal device, a size of the first rotating shaft 232 along the width direction F of the terminal device can be reduced, and a width of the terminal device can be reduced.

Figure 11B:
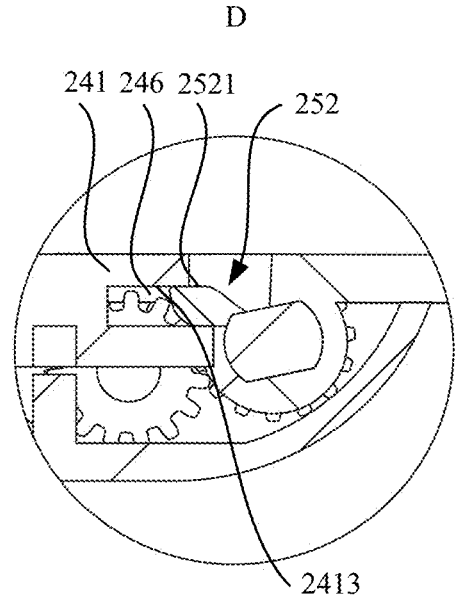
Figure 11C:
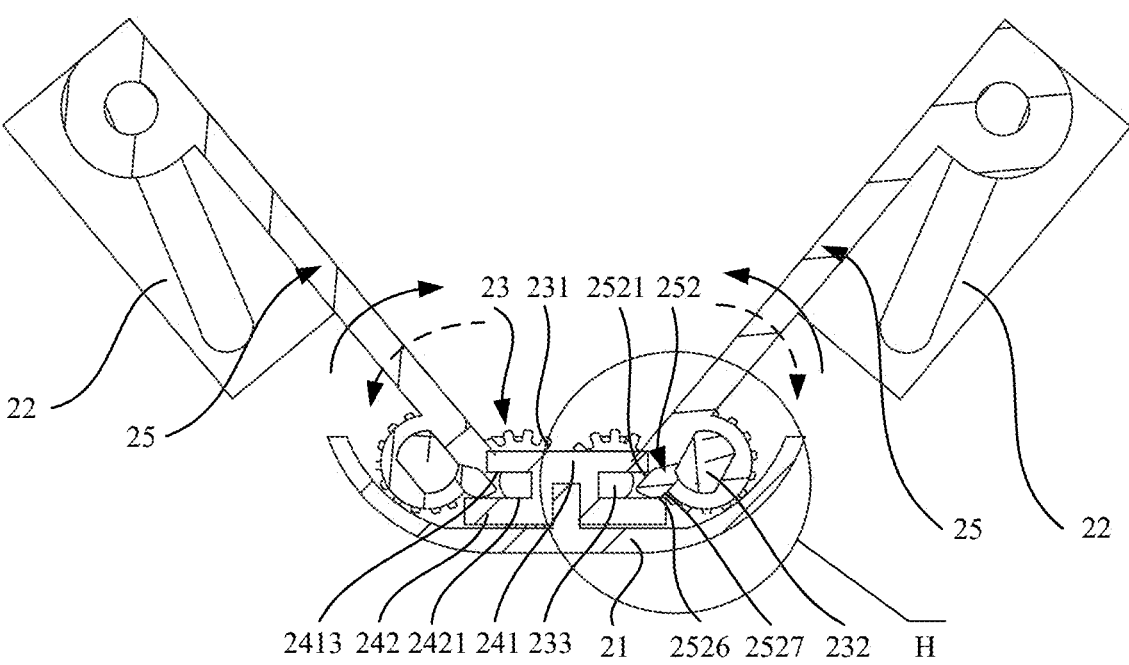
FIG. 11c is a schematic diagram of a structure of the folding mechanism shown in FIG. 3 when a folding angle is 100°.

As shown in FIG. 11c, because the first rotating shaft 232 is rotatably connected to the base 21, in a process of folding or unfolding the foldable mobile phone, the first rotating shaft 232 may rotate around an axis of the first rotating shaft 232, and the torsion swing arm 25 may rotate with the first rotating shaft 232. Because the two gears 231 on the edges of the synchronization mechanism 23 are respectively fastened to the two first rotating shafts 232, and the four gears 231 rotate synchronously, the two first rotating shafts 232 also rotate synchronously, and the two torsion swing arms 25 respectively fastened to the two first rotating shafts 232 also rotate synchronously.

Figure 10A:
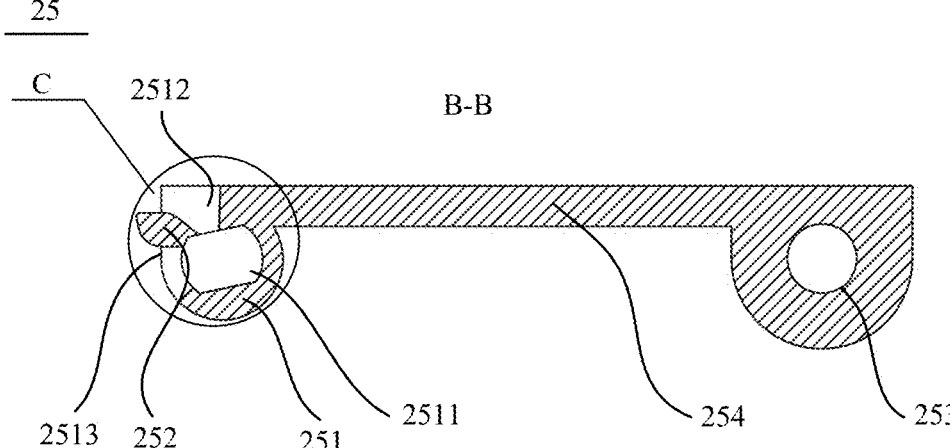
FIG. 10a is a sectional view of the torsion swing arm shown in FIG. 9 in a BB direction.

As shown in FIG. 9 and FIG. 10a, the first side surface 2513 of the first rotating portion 251 extends inwardly and is provided with a rotating portion incision 2512, and the rotating portion incision 2512 is connected to the first through hole 2511.

As shown in FIG. 9, a second through hole 2531 is disposed on the second side surface 2514 of the second rotating portion 253, and the second through hole 2531 may be a circular hole. As shown in FIG. 3, the second rotating portion 253 is farther from the base 21 than the first rotating portion 251.

As shown in FIG. 9, two ends of the connecting plate 254 are respectively fastened to the first rotating portion 251 and the second rotating portion 253. The connecting plate 254, the first rotating portion 251, the second rotating portion 253, and the rotating body 252 may be formed in an integrated molding manner or in a split molding manner. When an integrated molding manner is used, the entire torsion swing arm 25 may be fabricated by using a casting method. When the torsion swing arm 25 is fabricated in a split molding manner, the first rotating portion 251, the second rotating portion 253, the connecting plate 254, and the rotating body 252 may be separately fabricated, and the four components are welded to the torsion swing arm 25.

Figure 12:
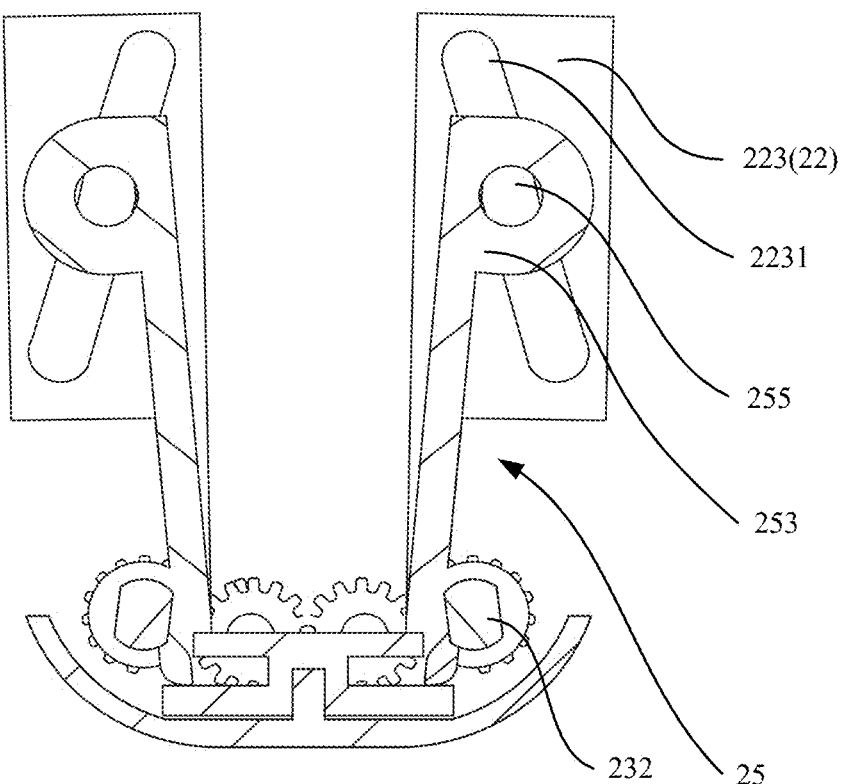
FIG. 12 is another schematic diagram of a structure of the folding mechanism shown in FIG. 3 in a folded state.

As shown in FIG. 4, one end of the coupling shaft 255 is rotatably connected to the second rotating portion 253, and the other end is slidably connected to the chute 2231 of the second clamping portion 223 of the main swing arm 22. When the foldable mobile phone is in a flattened state, the coupling shaft 255 is located in a remote position that is in the chute 2231 and that is far away from the center of the base 21. In a process of folding the foldable mobile phone, the torsion swing arm 25 rotates around the first rotating shaft 232, and the main swing arm 22 moves along the circular arc surface of the blocking portion 213. Therefore, actual movement of the main swing arm 22 is swinging. For example, in a process of rotating counterclockwise, the main swing arm 22 on the right further slides to the right. A distance between a distal end of the chute 2231 on the main swing arm 22 and the first rotating shaft 232 gradually increases, and a distance between the coupling shaft 255 and the first rotating shaft 232 remains unchanged. Therefore, as shown in FIG. 12, in a moving process of the torsion swing arm 25 and the main swing arm 22, the coupling shaft 255 slides along the chute 2231 of the second clamping portion 223. In a moving process of the main swing arm 22, there are always two support positions. One support position is provided by the mounting base 212 shown in FIG. 4, and the other support position is provided by the coupling shaft 255. Therefore, the mounting base 212 and the coupling shaft 255 may provide stable support for the main swing arm 22, thereby improving stability of the main swing arm 22 in a moving process.

Figures 10B, 11A:
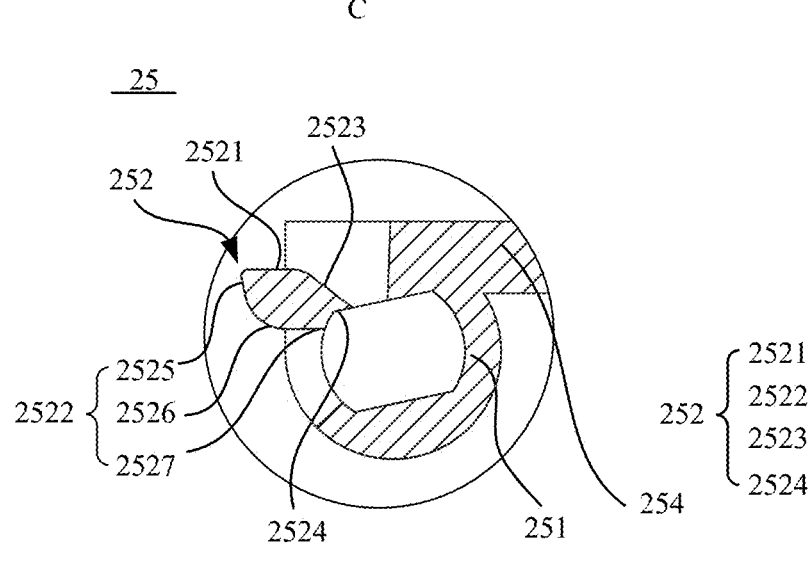

As shown in FIG. 9, the rotating body 252 is in a strip-like structure, and two end faces of the rotating body 252 are respectively fastened to two incision side walls 2515 of the rotating portion incision 2512. Therefore, a lateral size of the torsion swing arm 25 can be reduced, so that occupied space of the folding mechanism 20 in the width direction F of the foldable mobile phone is reduced. As shown in FIG. 11a, the rotating bodies 252 of the two torsion swing arms 25 are of a symmetrical structure about a center of the base 21.

As shown in FIG. 10b, a side surface of the rotating body 252 includes a first pressure surface 2521, a second pressure surface 2522, a third connection surface 2524, and a first connection surface 2523 that are sequentially connected to each other, and the first pressure surface 2521 is connected to the third connection surface 2524. As shown in FIG. 11a, when the foldable mobile phone is in a flattened state, the first pressure surface 2521 abuts against the upper fixing plate 241 of the support body 24.

As shown in FIG. 10b, the second pressure surface 2522 includes a first plane 2525, a circular arc plane 2526, and a second plane 2527 that are sequentially connected. Both the first plane 2525 and the second plane 2527 are tangent to the circular arc plane 2526, the first plane 2525 is connected to the first pressure surface 2521, and the second plane 2527 is connected to the third connection surface 2524.

As shown in FIG. 11a, a part of the rotating body 252 extends into the groove 246. When the foldable mobile phone is in a flattened state, the first pressure surface 2521 abuts against a lower surface 2413 of the upper fixing plate 241. In this way, the rotating body 252 can provide a force for the support body 24 to deviate from the base 21, so that an upper surface of the upper fixing plate 241 and an upper surface of the torsion swing arm 25 are located on a same plane, and jointly provide support for the flexible display 30 (not shown in FIG. 11a). As shown in FIG. 11b, the first pressure surface 2521 may be a plane. In this way, when the foldable mobile phone is in a flattened state, fit between the first pressure surface 2521 and the upper fixing plate 241 is fit between planes. Therefore, the first pressure surface 2521 can provide stable support for the upper fixing plate 241.

Figure 11D:
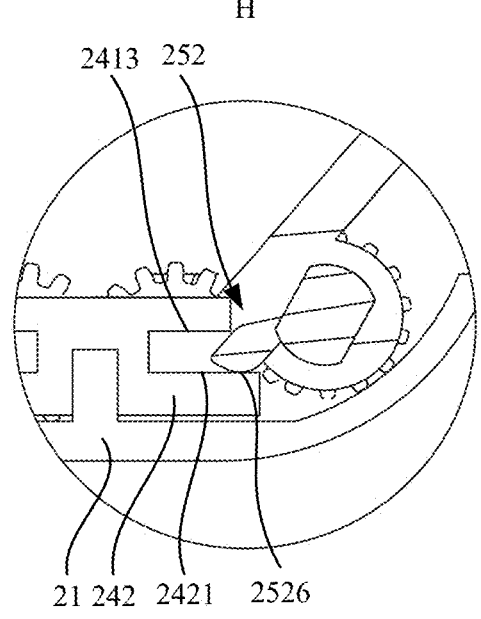
FIG. 11d is a partially enlarged schematic view of H in the schematic structural diagram shown in FIG. 11c.

FIG. 11c is a schematic diagram of a structure of the folding mechanism 20 when the foldable mobile phone is folded to 100°. As shown in FIG. 11c, in a process of folding the foldable mobile phone, the first rotating shaft 232 rotates around an axis of the first rotating shaft 232, and the torsion swing arm 25 rotates with the first rotating shaft 232. Therefore, a rotation center of the torsion swing arm 25 is the axis of the first rotating shaft 232, and a rotation center of the rotating body 252 is also the axis of the first rotating shaft 232. In a process in which the rotating body 252 rotates around the axis of the first rotating shaft 232, as shown in FIG. 11d, the circular arc surface 2526 gradually is in contact with the lower fixing plate 242. The foldable mobile phone continues to fold, the rotating body 252 continues to rotate, and the circular arc surface 2526 of the rotating body 252 on the right side rotates downward to the right, and the circular arc surface 2526 is always in an tangent state with the upper surface 2421 of the lower fixing plate 242, and provides a force for the lower fixing plate 242 to move toward the base 21. The lower fixing plate 242 may move toward the base 21 under the action of the force, that is, move in a direction that is away from the flexible display 30 (not shown in FIG. 11d).

Figure 11E:
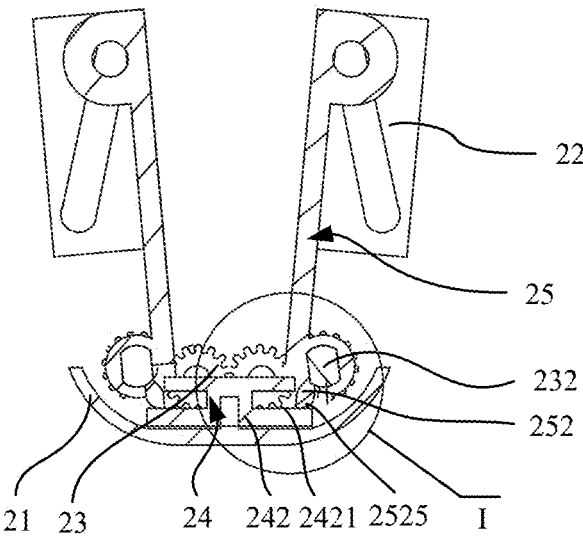
FIG. 11e is a schematic diagram of a structure of the folding mechanism shown in FIG. 3 in a folded state.
Figure 11F:
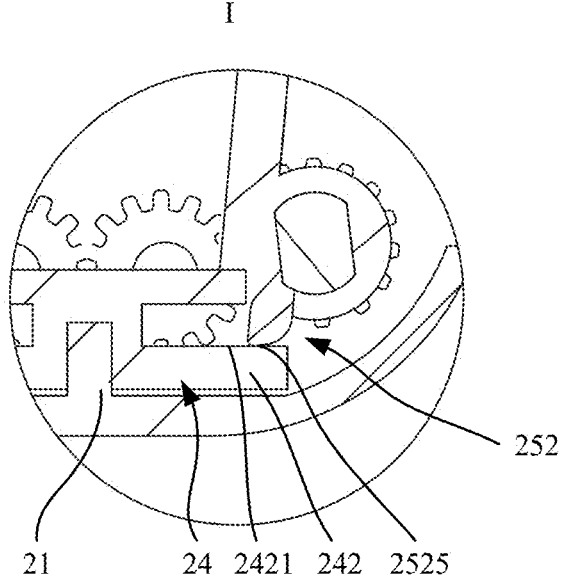
FIG. 11f is a partially enlarged schematic view of I in the schematic structural diagram shown in FIG. 11e.

The rotating body 252 continues to rotate until the foldable mobile phone is in a folded state. As shown in FIG. 11e and FIG. 11f, when the foldable mobile phone is folded into a folded state, the first plane 2525 of the rotating body 252 still abuts against the lower fixing plate 242, so as to continue to provide a force toward the base 21 for the support body 24. Because both the first plane 2525 and the upper surface 2421 of the lower fixing plate 242 are planes, an action between the rotating body 252 and the lower fixing plate 242 is an action between planes. Therefore, the rotating body 252 can provide a stable force for the lower fixing plate 242 by using the first plane 2525, and the support body 24 is suspended in the position, so that the support body 24 avoids a bent area of the flexible display 30 (not shown in FIG. 11e and FIG. 11f). Because the folding mechanism 20 in this embodiment of this application does not need to use a spring, space required when the spring is compressed to a limit does not need to be reserved. That is, in this embodiment of this application, space in the thickness direction G of the foldable mobile phone can be reduced, and a thickness of the foldable mobile phone is further reduced.

In a process of unfolding the foldable mobile phone, as shown in FIG. 11c, the rotating body 252 on the right side rotates clockwise with the first rotating shaft 232. When the rotating body 252 rotates until the first pressure surface 2521 is in contact with the lower surface 2413 of the upper fixing plate 241, the rotating body 252 continues to rotate, and the rotating body 252 may provide a force for the upper fixing plate 241 to deviate from the base 21. When the foldable mobile phone is in a flattened state, the upper fixing plate 241 may move to be flush with the upper surface of the torsion arm 25 under the action of the force of the rotating body 252.

As shown in FIG. 11*a*, the third connection surface 2524 of the rotating body 252 is a surface facing the first rotating shaft 232. When the torsion swing arm 25 is fastened to the first rotating shaft 232, the third connection surface 2524 is in contact with or has a clearance with the first rotating shaft 232. In this way, interference between parts can be avoided, and it is convenient to assemble the torsion swing arm 25 and the first rotating shaft 232.

Figure 13:
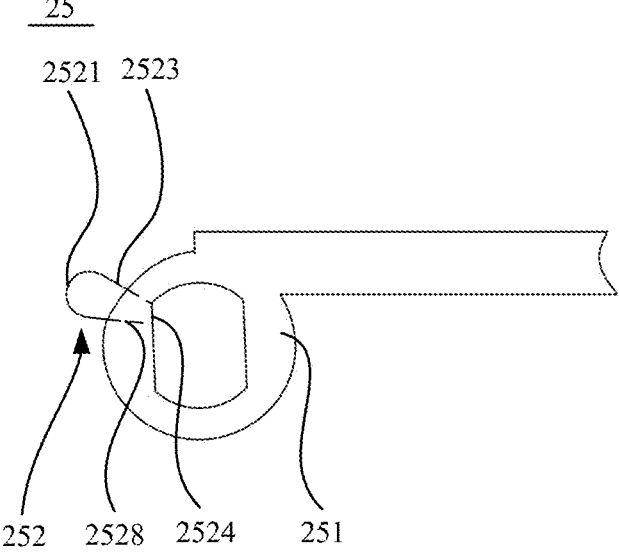
FIG. 13 is a partially enlarged schematic view of a torsion swing arm according to another embodiment of this application.

In another embodiment of this application, a difference from the embodiment shown in FIG. 10*a* lies in a structure of the rotating body 252. Specifically, as shown in FIG. 13, the rotating body 252 includes the third connection surface 2524, the first connection surface 2523, the first pressure surface 2521, and a second connection surface 2528 that are sequentially connected, and the third connection surface 2524 is connected to the second connection surface 2528. The first pressure surface 2521 is a circular arc surface.

Figure 14A:
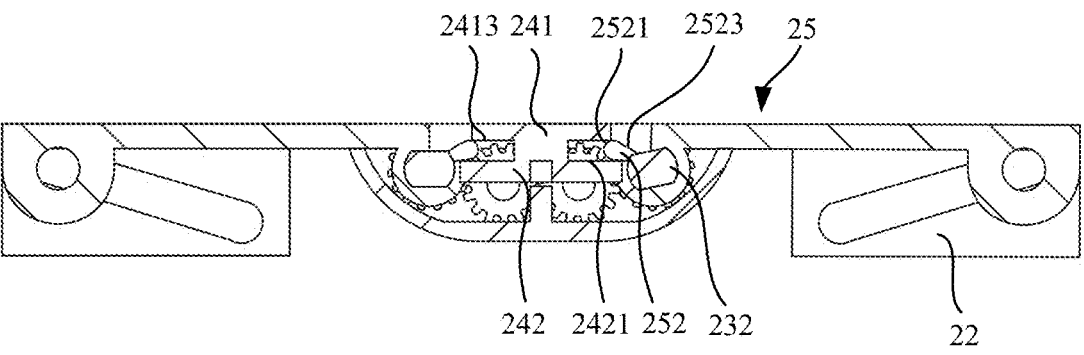
FIG. 14*a* is a schematic diagram of a structure of a folding mechanism in a flattened state according to another embodiment of this application.
Figure 14B:
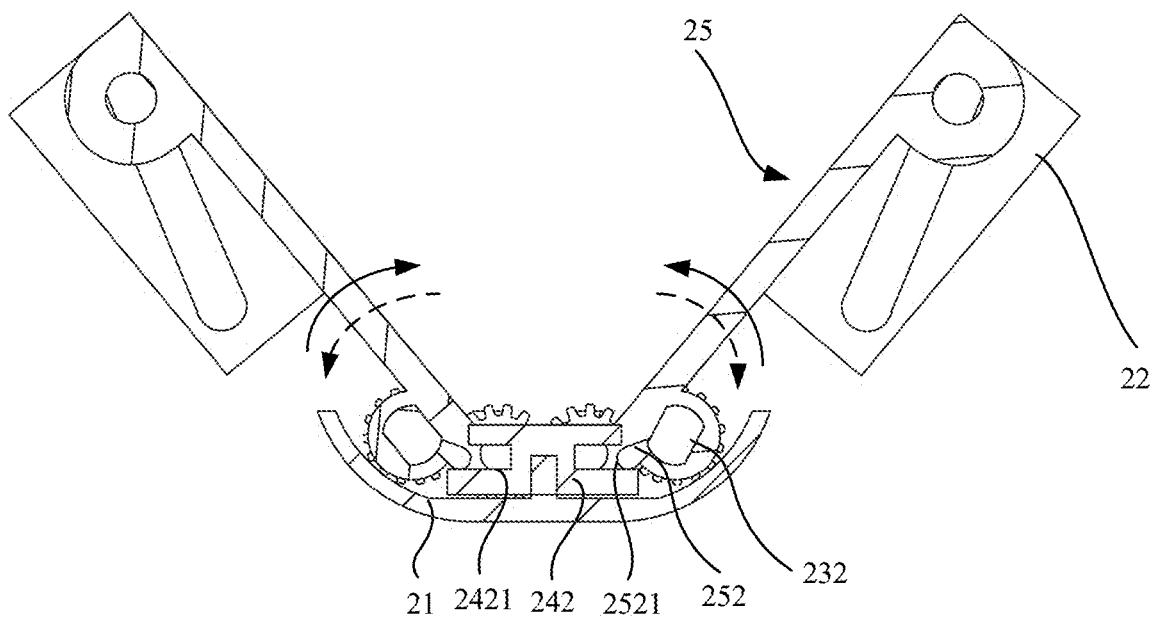
FIG. 14*b* is a schematic diagram of a structure of a folding mechanism when a folding angle is 100° according to another embodiment of this application.

As shown in FIG. 14*a*, when the foldable mobile phone is in a flattened state, the first pressure surface 2521 abuts against the lower surface 2413 of the upper fixing plate 241. In a process of folding the foldable mobile phone, as shown in FIG. 14*b*, the rotating body 252 rotates with the first rotating shaft 232, the rotating body 252 moves until the first pressure surface 2521 abuts against the upper surface 2421 of the lower fixing plate 242. The rotating body 252 continues to rotate, a force toward the base 21 may be provided for the lower fixing plate 242. The lower fixing plate 242 moves toward the base 21 under the action of the force until the foldable mobile phone is in a folded state, the rotating body 252 stops moving, and the lower fixing plate 242 also stops moving. The rotating body 252 may continuously provide a force for the lower fixing plate 242, so that the lower fixing plate 242 is suspended in the position, thereby avoiding a bent area of the flexible display 30 (not shown in FIG. 14*a*).

In another embodiment of this application, a difference from the embodiment shown in FIG. 3 lies in a structure of the upper fixing plate 241 of the support body 24, quantities of first rotating portions 251 and the rotating bodies 252 in the torsion swing arm 25, and a structure of the connecting plate 254.

Figure 15A:
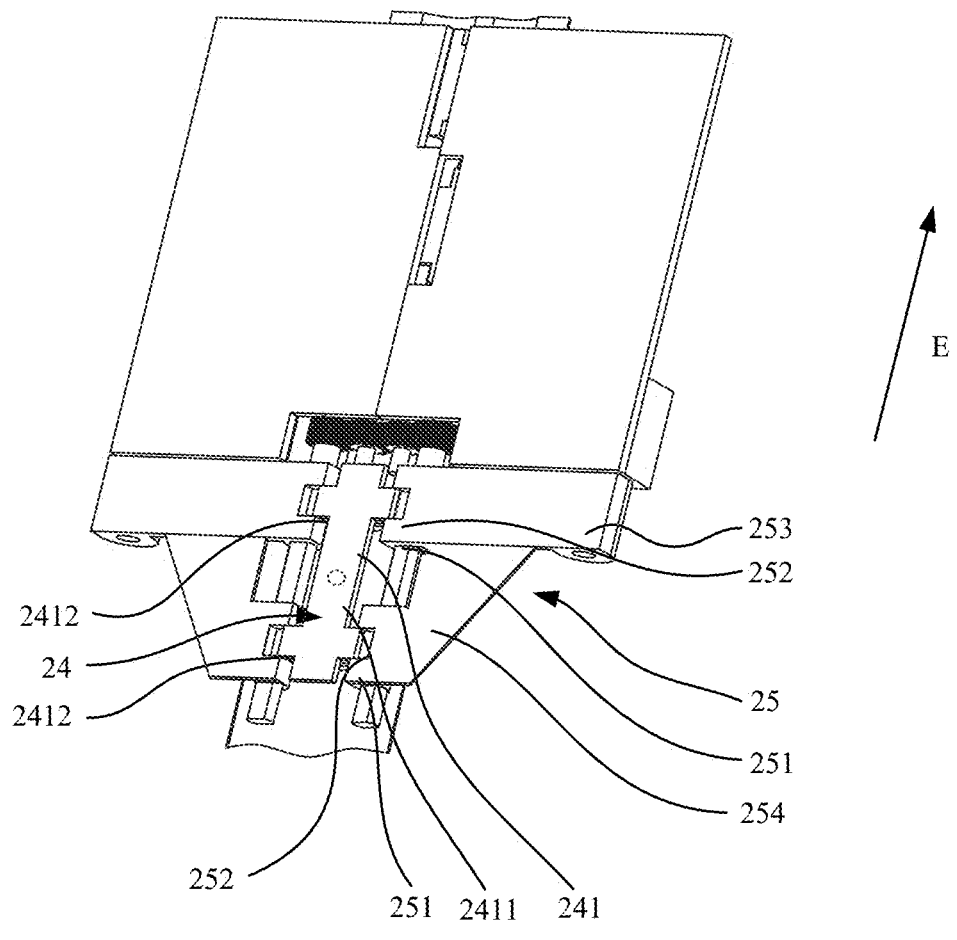
FIG. 15*a* is a schematic diagram of a structure of a folding mechanism according to still another embodiment of this application.
Figure 15B:
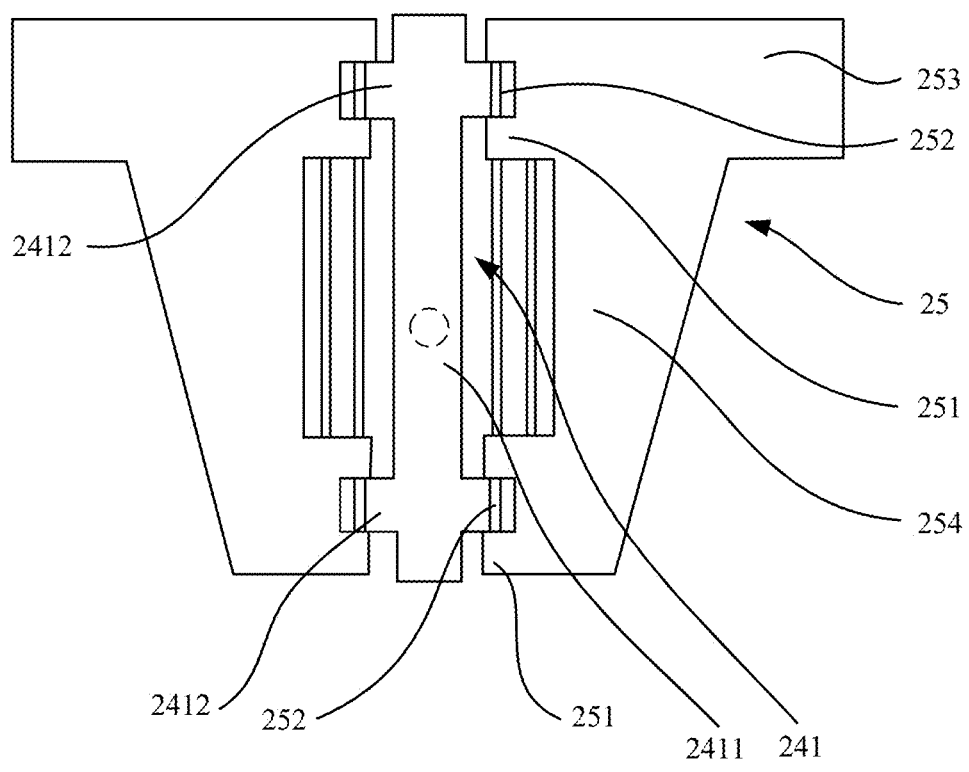
FIG. 15*b* is a partially enlarged schematic view of the folding mechanism shown in FIG. 15*a;*

Specifically, as shown in FIG. 15*a* and FIG. 15*b*, the upper fixing plate 241 is in a strip-like structure; the upper fixing plate 241 may include the fastening body 2411 and four convex portions 2412 located on the sides of the fixing body 2411; and there are two convex portions 2412 of each side of the fastening body 2411, and the two convex portions 2412 are arranged along the side of the fixing body 2411. In another embodiment, there may be three or more convex portions 2412 on one side of the fastening body 2411.

Correspondingly, referring to FIG. 15*a*, in this embodiment, quantities of the first rotating portions 251 and the rotating bodies 252 in the torsion swing arm 25 are the same as a quantity of the convex portions 2412 arranged on one side of the upper fixing plate 241, and they are two. Specifically, the two first rotating portions 251 and the rotating bodies 252 are arranged along the length direction E. The connecting plate 254 has a large connection area, and connects the two first rotating portions 251 and the second rotating portion 253.

In this embodiment, as shown in FIG. 15*a*, because a length of the support body 24 is longer, a contact area between the support body 24 and the flexible display 30 (not shown in FIG. 15*a*) is larger, so that more stable support can be provided for the flexible display 30.

Figure 16:
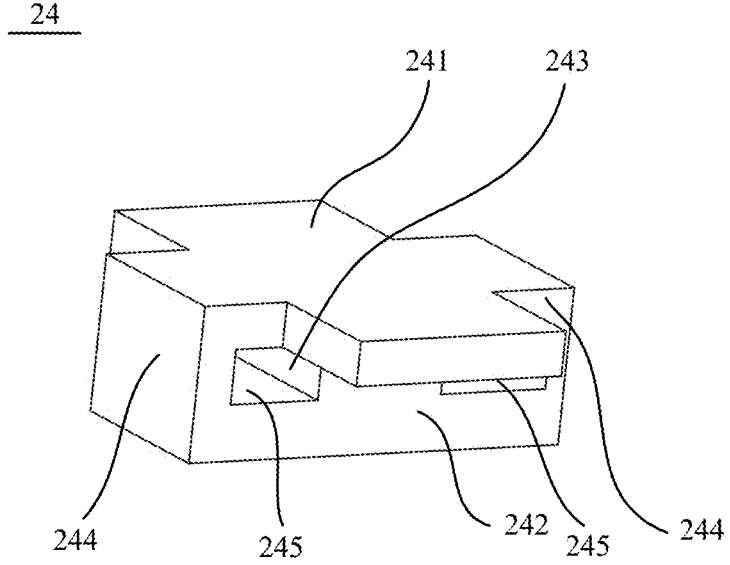
FIG. 16 is a schematic diagram of a structure of a support body in still another embodiment.

In still another embodiment of this application, a difference from the embodiment shown in FIG. 11*a* lies in the structure of the support body 24 and the structures of the first rotating portion 251 and the rotating body 252 on the torsion swing arm 25. Specifically, as shown in FIG. 16, the support body 24 includes the upper fixing plate 241, the lower fixing plate 242, the vertical fixing plate 243, and two side fixing plates 244. The upper fixing plate 241 and the lower fixing plate 242 are parallel to each other, the vertical fixing plate 243 is fastened between the upper fixing plate 241 and the lower fixing plate 242, and the vertical fixing plate 243 are perpendicular to both the upper fixing plate 241 and the lower fixing plate 242. The lower fixing plate 242 is closer to the base 21 than the upper fixing plate 241. The two side fixing plates 244 are respectively fastened on two sides of the upper fixing plate 241 and the lower fixing plate 242, and each side fixing plate 244 and the upper fixing plate 241 and the lower fixing plate 242 may form an accommodating cavity 245 that has closed sides and open ends. Therefore, two accommodating cavities 245 are formed on the support body 24.

Figure 17:
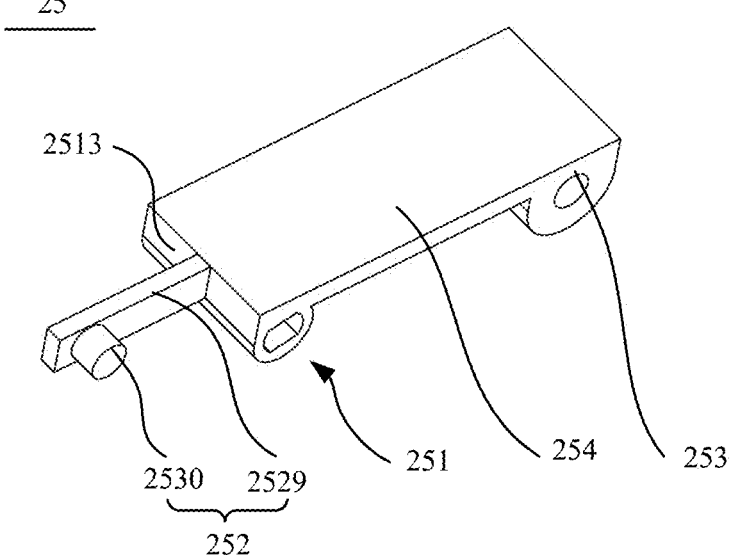
FIG. 17 is a schematic diagram of a structure of a torsion swing arm in still another embodiment.

As shown in FIG. 17, the first rotating portion 251 has the first side surface 2513 that is away from the second rotating portion 253, the first side surface 2513 is a plane, and the rotating body 252 is fastened to the first side surface 2513 of the first rotating portion 251.

Figure 18:
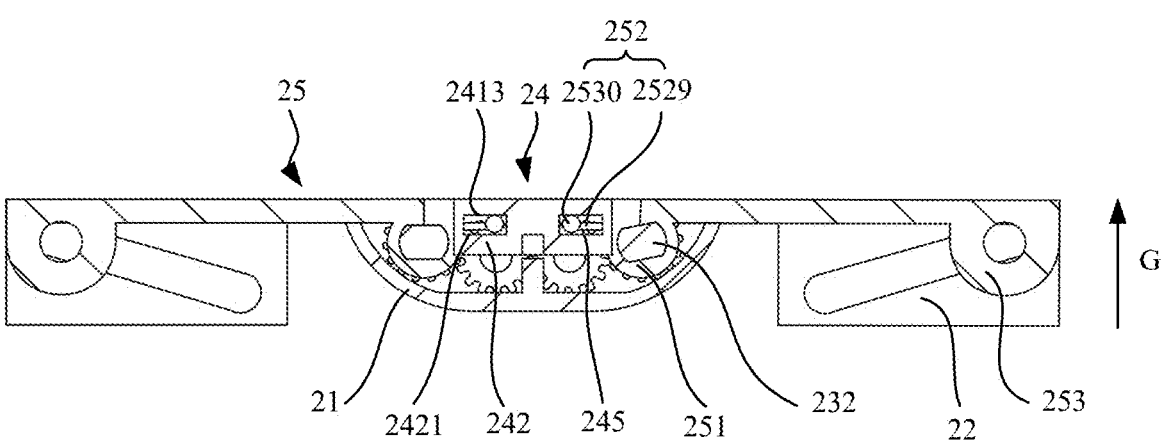
FIG. 18 is a schematic diagram of a structure of a foldable structure in a flattened state in still another embodiment.

As shown in FIG. 17, the rotating body 252 includes a connector 2529 and a fixing post 2530, where the connector 2529 is fastened to the first side surface 2513, and the fixing post 2530 is fastened to a surface that is of the connector 2529 and that faces the support body 24. The connector 2529 may be a strip-like plate structure. As shown in FIG. 18, a length direction of the connector 2529 extends toward the support body 24.

As shown in FIG. 17, one end of the fixing post 2530 is fastened to the connector 2529. As shown in FIG. 18, the other end of the fixing post 2530 extends into the accommodating cavity 245 of the support body 24, and when the foldable mobile phone is in a flattened state, the fixing post 2530 abuts against the lower surface 2413 of the upper fixing plate 241. In this way, the fixing post 2530 can provide a force for the support body 24 to deviate from the base 21, so that the support body 24 provides support for the flexible display 30 (not shown in FIG. 17). In a process of folding the foldable mobile phone, the rotating body 252 rotates with the first rotating shaft 232, and when the rotating body 252 continues to rotate when a surface of the rotating body 252 abuts against the upper surface 2421 of the lower fixing plate 242, the rotating body 252 continues to rotate, a force toward the base 21 may be provided for the lower fixing plate 242, and the lower fixing plate 242 moves toward the base 21 under the action of the force. Until the foldable mobile phone is in a folded state, the rotating body 252 stops moving, and the lower fixing plate 242 stops moving. The rotating body 252 may continuously provide a force for the lower fixing plate 242, so that the lower fixing plate 242 is suspended in the position, thereby avoiding a bent area of the flexible display 30. Because the folding mechanism 20 in this embodiment of this application does not need to use a spring, space required when the spring is compressed to a limit does not need to be reserved. That is, in this embodiment of this application, space in the thickness direction G of the foldable mobile phone can be reduced, and a thickness of the foldable mobile phone is further reduced.

Embodiments of this application are described with reference to the accompanying drawings. However, this application is not limited to the foregoing specific implementations. The foregoing specific implementations are merely examples, but are not limiting. A person skilled in the art may make many forms without departing from the object and the scope of the claims of this application and are within the protection scope of this application.

What is claimed is:

1. A folding mechanism, comprising:

a base;

a support body comprising a first fixing plate and a second fixing plate, wherein the support body is connected to the base such that the second fixing plate is closer to the base than the first fixing plate, the support body is provided with a first groove and a second groove that are corresponding to each other in position and located between the first fixing plate and the second fixing plate, and the support body may move toward or away from the base;

a first swing arm, wherein the first swing arm comprises a first rotating portion and a first rotating body fastened to the first rotating portion, the first rotating portion is rotatably connected to the base, a part of the first rotating body extends into the first groove, and the first rotating body is configured to provide a force for the support body in a rotation process, so that the support body moves toward or away from the base; and a second swing arm, wherein the second swing arm comprises a second rotating portion and a second rotating body fastened to the second rotating portion, the second rotating portion is rotatably connected to the base, a part of the second rotating body extends into the second groove, and the second rotating body is configured to provide a force for the support body in a rotation process, so that the support body moves toward or away from the base.

2. The folding mechanism according to claim 1, wherein the first fixing plate and the second fixing plate are disposed opposite to each other and a third fixing plate is connected between the first fixing plate and the second fixing plate, and the third fixing plate separates space between the first fixing plate and the second fixing plate into the first groove and the second groove.

3. The folding mechanism according to claim 2, wherein the a size of the second fixing plate in a first direction is greater than a size of the first fixing plate in the first direction; and the first direction is an arrangement direction of the first swing arm and the second swing arm.

4. The folding mechanism according to claim 3, wherein the first rotating body comprises a connector and a fastener fastened to the connector, at least a part of the fastener extends into the first groove, and the fastener is configured to provide a force for the support body to move toward or away from the base in a rotation process.

5. The folding mechanism according to claim 4, wherein the connector is located on a side surface of the support body, the fastener is disposed toward the side surface, and the side surface is a surface adjacent to a side on which the first swing arm is located.

6. The folding mechanism according to claim 3, wherein the folding mechanism further comprises a third swing arm, the third swing arm is connected to the base in a manner that the third swing arm can slide along an arc surface, the third swing arm and the first swing arm are arranged in a second direction, and the third swing arm is connected to the first swing arm, so that the third swing arm moves relative to the base in a manner synchronous with the first swing arm; the folding mechanism further comprises a fourth swing arm, and the fourth swing arm is connected to the base in a manner that the third swing arm can slide along an arc surface; and the fourth swing arm and the second swing arm are arranged in the second direction, and the fourth swing arm is connected to the second swing arm, so that the fourth swing arm moves relative to the base in a manner synchronous with the second swing arm; and the second direction is perpendicular to a movement direction of the support body and the first direction.

7. The folding mechanism according to claim 6, wherein a first chute is disposed on a surface that is of the third swing arm and that faces the first swing arm; and the first swing arm further comprises a third rotating portion fastened to the first rotating portion and a first coupling shaft rotatably connected to the third rotating portion, and a part of the first coupling shaft extends into the first chute; wherein a second chute is disposed on a surface that is of the fourth swing arm and that faces the second swing arm; and the second swing arm further comprises a fourth rotating portion fastened to the second rotating portion and a second coupling shaft rotatably connected to the third rotating portion, and a part of the second coupling shaft extends into the second chute.

8. The folding mechanism according to claim 3, wherein the first swing arm and the second swing arm are symmetrical about a center plane of the support body, and the center plane is a plane that is located in a geometric center of the support body and that is perpendicular to the first direction.

9. The folding mechanism according to claim 2, wherein the first fixing plate has a first surface facing the second fixing plate; and the first rotating body comprises a first pressure surface, and when the first swing arm and the second swing arm are in a flattened state, the first pressure surface abuts against the first surface.

10. The folding mechanism of claim 9, wherein the second fixing plate has a second surface facing the first fixing plate; and the first rotating body further comprises a second pressure surface connected to the first pressure surface, and in a process of folding the first swing arm and the second swing arm, the second pressure surface interacts with the second surface.

11. The folding mechanism according to claim 10, wherein the second pressure surface comprises a second plane, the second plane is connected to the first pressure surface, and when the first swing arm and the second swing arm are in a folded state, the second plane abuts against the second surface.

12. The folding mechanism according to claim 11, wherein the second pressure surface further comprises a first arc surface that is connected to the second plane and protrudes outward.

13. The folding mechanism according to claim 12, wherein the second pressure surface further comprises a third plane connected to the first arc surface, and the third plane is further configured to: when the first swing arm and the second swing arm are in a flattened state, a part of the third plane abuts against the second surface.

14. The folding mechanism according to claim 10, wherein the first pressure surface and the second pressure surface are connected to form a second arc surface, and in a process of folding the first swing arm and the second swing arm, the second arc surface interacts with the second surface; and in a process of unfolding the first swing arm and the second swing arm, the second arc surface interacts with the first surface.

15. The folding mechanism according to claim 9, wherein the first pressure surface comprises a first plane.

16. The folding mechanism according to claim 2, wherein a first incision is disposed on a first side surface of the first rotating portion, a part of the first rotating body extends into the first incision, and the first side surface is a surface that is of the first rotating body and that is opposite to the second rotating portion when the first swing arm and the second swing arm are in a flattened state; wherein the first incision has two opposite side walls, and the first rotating body is fastened to the two side walls.

17. The folding mechanism according to claim 16, wherein the first fixing plate comprises a fastening body and a convex portion fastened to one side of the fastening body, and a part of the convex portion extends into the first incision.

18. The folding mechanism according to claim 16, wherein a first through hole is disposed on a second side surface of the first rotating portion, the second side surface is adjacent to the first side surface, and the first incision is connected to the first through hole; and the first rotating body further has a connection surface facing the first through hole, and a projection of the connection surface on the side wall is in contact with or has a clearance with an edge of a projection of the first through hole on the side wall.

19. The folding mechanism according to claim 18, wherein there are a plurality of first rotating bodies, there are a plurality of first grooves, and at least two first rotating bodies are in a one-to-one correspondence with two first grooves;

there are a plurality of second rotating bodies, there are a plurality of second grooves, and at least two second rotating bodies are in a one-to-one correspondence with two second grooves.

20. A terminal device, comprising:

a folding mechanism, the folding mechanism comprising:

a base;

a support body comprising a first fixing plate and a second fixing plate, wherein the support body is connected to the base such that the second fixing plate is closer to the base than the first fixing plate, the support body is provided with a first groove and a second groove that are corresponding to each other in position and located between the first fixing plate and the second fixing plate, and the support body may move toward or away from the base;

a first swing arm, wherein the first swing arm comprises a first rotating portion and a first rotating body fastened to the first rotating portion, the first rotating portion is rotatably connected to the base, a part of the first rotating body extends into the first groove, and the first rotating body is configured to provide a force for the support body in a rotation process, so that the support body moves toward or away from the base; and a second swing arm, wherein the second swing arm comprises a second rotating portion and a second rotating body fastened to the second rotating portion, the second rotating portion is rotatably connected to the base, a part of the second rotating body extends into the second groove, and the second rotating body is configured to provide a force for the support body in a rotation process, so that the support body moves toward or away from the base.

* * * * *